US011490059B2

(12) United States Patent
Narita et al.

(10) Patent No.: US 11,490,059 B2
(45) Date of Patent: Nov. 1, 2022

(54) LIGHT SOURCE DEVICE AND PROJECTION TYPE DISPLAY DEVICE

(71) Applicant: SONY CORPORATION, Tokyo (JP)

(72) Inventors: Yosuke Narita, Tokyo (JP); Hideaki Okano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,587

(22) PCT Filed: Jul. 5, 2019

(86) PCT No.: PCT/JP2019/026754
§ 371 (c)(1),
(2) Date: Feb. 5, 2021

(87) PCT Pub. No.: WO2020/036013
PCT Pub. Date: Feb. 20, 2020

(65) Prior Publication Data
US 2021/0314537 A1 Oct. 7, 2021

(30) Foreign Application Priority Data

Aug. 16, 2018 (JP) .............................. JP2018-153315

(51) Int. Cl.
H04N 9/31 (2006.01)
G02B 19/00 (2006.01)
(Continued)

(52) U.S. Cl.
CPC ....... H04N 9/3161 (2013.01); G02B 19/0028 (2013.01); G02B 19/0057 (2013.01);
(Continued)

(58) Field of Classification Search
CPC .. H04N 9/3161; H04N 9/3152; H04N 9/3158; H04N 9/3164; G02B 19/0028;
(Continued)

(56) References Cited

U.S. PATENT DOCUMENTS

2005/0087735 A1  4/2005  Behringer et al.
2011/0103056 A1  5/2011  Wolak et al.
(Continued)

FOREIGN PATENT DOCUMENTS

CN  102089943 A  6/2011
CN  103250096 A  8/2013
(Continued)

OTHER PUBLICATIONS

International Search Report and Written Opinion of PCT Application No. PCT/JP2019/026754, dated Sep. 17, 2019, 15 pages of ISRWO.

(Continued)

Primary Examiner — Bao Q Truong
(74) Attorney, Agent, or Firm — Chip Law Group

(57) ABSTRACT

Provided is a light source device including a laser light source group including at least one multi-emitter laser light source and at least one non-multi-emitter laser light source that emits a colored light different from that of the multi-emitter laser light source, a collimator lens having at least one cylindrical surface that adjusts a laser light emitted from the at least one multi-emitter laser light source, and a light guide unit that performs color synthesis of a laser light emitted from the at least one multi-emitter laser light source and having passed through the cylindrical surface and a laser light emitted from the at least one non-multi-emitter laser light source.

14 Claims, 13 Drawing Sheets

(51) Int. Cl.
    *G02B 27/14*     (2006.01)
    *G02B 27/18*     (2006.01)
    *G03B 21/20*     (2006.01)

(52) U.S. Cl.
    CPC .......... *G02B 27/141* (2013.01); *G02B 27/18* (2013.01); *G03B 21/2033* (2013.01); *H04N 9/3152* (2013.01); *H04N 9/3158* (2013.01); *H04N 9/3164* (2013.01)

(58) Field of Classification Search
    CPC .. G02B 19/0057; G02B 27/141; G02B 27/18; G03B 21/2033
    See application file for complete search history.

(56) References Cited

U.S. PATENT DOCUMENTS

| | | | |
|---|---|---|---|
| 2012/0044280 A1* | 2/2012 | Nakayama | H04N 9/3161 345/204 |
| 2016/0057397 A1* | 2/2016 | Kurosaki | G02B 27/0927 353/31 |
| 2016/0198135 A1 | 7/2016 | Kita et al. | |
| 2017/0115497 A1 | 4/2017 | Chen et al. | |
| 2019/0056646 A1 | 2/2019 | Akiyama | |

FOREIGN PATENT DOCUMENTS

| | | |
|---|---|---|
| CN | 105474092 A | 4/2016 |
| CN | 105612739 A | 5/2016 |
| CN | 106199783 A | 12/2016 |
| CN | 106257329 A | 12/2016 |
| CN | 108604053 A | 9/2018 |
| JP | 2005-079580 A | 3/2005 |
| JP | 2009-099891 A | 5/2009 |
| JP | 2010-140745 A | 6/2010 |
| JP | 2011-520292 A | 7/2011 |
| JP | 2015-230866 A | 12/2015 |
| JP | 2016-045302 A | 4/2016 |
| JP | 2016-103423 A | 6/2016 |
| JP | 2017-138471 A | 8/2017 |
| JP | 2017-139354 A | 8/2017 |
| JP | 2018-013662 A | 1/2018 |
| JP | 2018-085252 A | 5/2018 |
| JP | 2018-534592 A | 11/2018 |
| JP | 2019-032471 A | 2/2019 |
| JP | 2019-035922 A | 3/2019 |
| JP | 2019-078947 A | 5/2019 |
| JP | 6536724 B1 | 7/2019 |
| KR | 10-2018-0088647 A | 8/2018 |
| WO | 2009/137703 A2 | 11/2009 |
| WO | 2015/056381 A1 | 4/2015 |
| WO | 2016/047450 A1 | 3/2016 |
| WO | 2017/069954 A1 | 4/2017 |

OTHER PUBLICATIONS

Office Action for CN Patent Application No. 201980053231.X, dated Dec. 8, 2021, 08 pages of Office Action.

Office Action for CN Patent Application No. 201980053231.X, dated May 26, 2022, 06 pages of English Translation and 09 pages of Office Action.

* cited by examiner

Y POSITION (Millimeters)

Y POSITION (Millimeters)

LIGHT SOURCE DEVICE AND PROJECTION TYPE DISPLAY DEVICE

CROSS REFERENCE TO RELATED APPLICATIONS

This application is a U.S. National Phase of International Patent Application No. PCT/JP2019/026754 filed on Jul. 5, 2019, which claims priority benefit of Japanese Patent Application No. JP 2018-153315 filed in the Japan Patent Office on Aug. 16, 2018. Each of the above-referenced applications is hereby incorporated herein by reference in its entirety.

TECHNICAL FIELD

The present technology relates to a light source device and a projection type display device. More specifically, the present technology relates to a light source device capable of uniformly forming illuminance of laser light and a projection type display device including the light source device.

BACKGROUND ART

An optical module, which is one of main components of a projection type display device, is generally constituted of an illumination optical system including a light source and a projection optical system including a light modulation element. As the light source, a light emitting diode (LED) light source or a semiconductor laser (LD) light source can be used. Since LEDs and LDs are small, for example, they are used as light sources for small projection type display devices such as pico projectors and portable projectors that are easy to carry.

Techniques for improving the illumination optical system of the projection type display device have been proposed hitherto. For example, Patent Document 1 below discloses a lighting device including a light source and a uniform illumination optical system that has a first fly-eye lens including a plurality of two-dimensionally arranged lenses and passing light based on emitted light from the light source, in which incident light on the first fly-eye lens has directivity, a first reference direction in a surface shape of an illumination target area extends along a direction substantially parallel to a major axis direction or a minor axis direction of an intensity distribution shape of the incident light on the first fly-eye lens, and a periodic direction of an arrangement of the lens in the first fly-eye lens is inclined with respect to the major axis direction or the minor axis direction (claim 1). By having the above configuration, the lighting device can reduce uneven brightness of the illumination light (paragraph 0012).

CITATION LIST

Patent Document

Patent Document 1: WO 2016/047450

SUMMARY OF THE INVENTION

Problems to be Solved by the Invention

If brightness of a small projection type display device can be increased, a clearer image can be presented to the user. Furthermore, by increasing the brightness, it may be unnecessary to darken the space in which the projection type display device is used.

In order to increase the brightness of the projection type display device, for example, it is conceivable to use a light source device including a multi-emitter type laser light source. However, although the multi-emitter type laser light source has a high output, the laser light emitted from the laser light source has luminous fluxes that are split by the number of emitters depending on the optical path length from the light source to the condensing position, and can bring about a reduction in uniformity of illuminance. Accordingly, an object of the present technology is to improve uniformity of laser light generated by a light source device including a multi-emitter type laser light source.

Solutions to Problems

The present technology provides a light source device including:

a laser light source group including at least one multi-emitter laser light source and at least one non-multi-emitter laser light source that emits a colored light different from that of the multi-emitter laser light source;

a collimator lens having at least one cylindrical surface that adjusts a laser light emitted from the at least one multi-emitter laser light source; and a light guide unit that performs color synthesis of a laser light emitted from the at least one multi-emitter laser light source and having passed through the cylindrical surface and a laser light emitted from the at least one non-multi-emitter laser light source.

According to one embodiment of the present technology, the light source device may further include an integrator optical system that converts a luminous flux aggregated by the color synthesis by the light guide unit into substantially parallel light.

According to one embodiment of the present technology, the integrator optical system may be conjugate with a two-dimensional spatial modulation element.

According to one embodiment of the present technology, the light source device may be used to form a projection type display device, and an angle of incidence $\theta$ (°) of the luminous flux on the integrator optical system may be within a range represented by a following formula (1), $$\theta < 180/\pi \cdot \sin^{-1}(NA) \qquad (1)$$

(where $NA=1/(2*F\#)$, $F\#=EFL/D$, $F\#$ is a projection lens of the projection type display device, EFL is a focal length of the projection lens of the projection type display device, and D is an aperture diameter of the projection lens).

According to one embodiment of the present technology, the light guide unit may include a cylindrical lens having a radius of curvature of $10 \text{ mm} < R < 100 \text{ mm}$ or a cylindrical mirror having a radius of curvature of $-100 \text{ mm} < R < -10 \text{ mm}$, and the cylindrical lens or the cylindrical mirror may be provided on an optical path of a laser light adjusted by the collimator lens.

According to one embodiment of the present technology, the light guide unit may include a dichroic mirror that transmits or reflects the laser light emitted from the multi-emitter laser light source and/or the laser light emitted from the non-multi-emitter laser light source, and the dichroic mirror has optical characteristics that improve a deflection ratio of laser light.

According to one embodiment of the present technology, the light source device may include a polarization optical element arranged on an optical path of the luminous flux aggregated by the color synthesis by the light guide unit, and the luminous flux may be incident on the optical element for polarization at substantially Brewster's angle.

According to one embodiment of the present technology, a plurality of multi-emitter laser light sources and/or a plurality of non-multi-emitter laser light sources may be arranged so that a traveling direction of a substantially central portion of each laser light on an emission surface of each of the light sources does not share one plane.

According to one embodiment of the present technology, the light source device may further include a second integrator optical system arranged on an optical path between the light guide unit and the integrator optical system.

According to one embodiment of the present technology, the second integrator optical system may include two fly-eye surfaces, the two fly-eye surfaces have same radius of curvatures R, and an angle of incidence θ (°) of the luminous flux on the fly-eye surface on a side of the light guide unit may be within a range represented by a following formula (2), $$\theta < 180/\pi \cdot \tan^{-1}(h/f) \quad (2)$$

(where $f = nR^2/((n-1)(2nR - t(n-1)))$, h is an image height (mm) of a cell of one fly-eye lens, f is a focal length (mm) of the fly-eye lens, n is a refractive index of the fly-eye lens, R is a radius of curvature (mm) of the fly-eye lens, and t is a core thickness (mm) of the fly-eye lens).

According to one embodiment of the present technology, the at least one non-multi-emitter laser light source may include a wide-emitter laser light source.

According to one embodiment of the present technology, the collimator lens may have one concave cylindrical surface, and a radius of curvature of the concave cylindrical surface may be −3 mm to −0.5 mm.

Furthermore, the present technology provides a projection type display device including a light source device that includes:

a laser light source group including at least one multi-emitter laser light source and at least one non-multi-emitter laser light source that emits a colored light different from that of the multi-emitter laser light source;

a collimator lens having at least one cylindrical surface that adjusts a laser light emitted from the multi-emitter laser light source; and a light guide unit that performs color synthesis of a laser light emitted from the at least one multi-emitter laser light source and having passed through the cylindrical surface and a laser light emitted from the at least one laser light source.

MODE FOR CARRYING OUT THE INVENTION

Figures 1A, 1B:
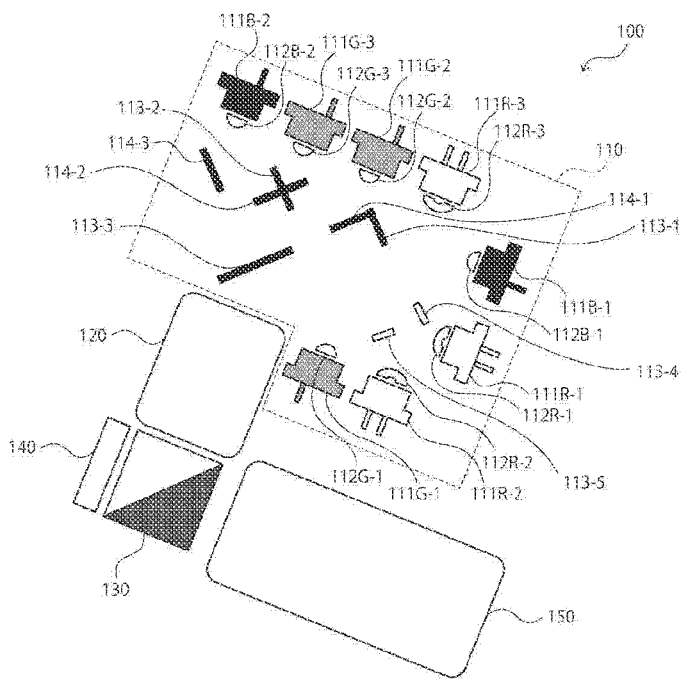
FIG. 1A is a view illustrating a configuration example of a projection type display device including a light source device according to the present technology.
FIG. 1B is a view in which optical paths are added to the light source device illustrated in FIG. 1A.

Hereinafter, preferred embodiments for carrying out the present technology will be described. Note that the embodiments described below are representative embodiments of the present technology, and the scope of the present technology is not limited to these embodiments. Note that the present technology will be described in the following order.

1. First embodiment (light source device)
  (1) Description of first embodiment
  (2) First example of first embodiment (projection type display device including light source device according to present technology)
  (3) Second example of first embodiment (projection type display device including light source device according to present technology)
  (4) Third example of first embodiment (another example of laser light source unit)
2. Second embodiment (projection type display device)
3. Example

1. First Embodiment (Light Source Device)

(1) Description of First Embodiment

In a light source device according to the present technology, a laser light emitted from at least one multi-emitter laser light source passes through a collimator lens having at least one cylindrical surface. Thus, a far field pattern (hereinafter, also referred to as FFP) of the multi-emitter laser light source has a similar shape to the FFP of the non-multi-emitter laser light source. Consequently, illuminance uniformity of color-synthesized laser lights is improved. As described above, the light source device according to the present technology can emit a laser light having a uniform illuminance even though the multi-emitter type laser light source is included. Therefore, for example, by employing a light source device according to the present technology as an illumination optical system of a projection type display device, it is possible to project an image having high brightness and uniform illuminance.

It is conceivable to increase the number of laser light sources in the light source device in order to increase brightness of a small projection type display device. However, in a case where the number of laser light sources is increased, a wider space is necessary for arranging the increased number of laser light sources, and it becomes difficult to miniaturize the projection type display device.

Development of a laser light source having a high output is also being in progress, and examples of the laser light source having a high output can include the multi-emitter laser light source. It is also possible to reduce the number of light sources by using the multi-emitter laser light source. However, a luminous flux emitted from the multi-emitter laser light source is split by the number of light emission points of the light source. For example, even if an aspherical lens is used to adjust the far field pattern (hereinafter also referred to as FFP) of the multi-emitter laser light source, the luminous flux is still split depending on the optical path length from the light source to the condensing position. Therefore, in a case where the luminous flux from the multi-emitter laser light source and the luminous flux from another laser light source are combined, the FFP of the multi-emitter laser light source and the FFP of the other laser light source may be different. In a case where a light source device including the multi-emitter laser light source and the other laser light source is used for the projection type display device, the difference may reduce uniformity of the illuminance of the projected image.

As described above, the light source device according to the present technology includes a multi-emitter laser light source, but can form a luminous flux having high illuminance uniformity. Moreover, because the light source device uses the multi-emitter laser light source, it is possible to be miniaturized while having a high output. Therefore, the projection type display device including the light source device can provide an image having uniform illuminance, and the device can be made brighter and also smaller.

Furthermore, in a case where one light source device includes a plurality of laser light sources, it is necessary to devise a two-dimensional or three-dimensional arrangement of the plurality of laser light sources in order to synthesize a plurality of laser lights emitted from the plurality of laser light sources. For example, it is necessary to guide the plurality of laser lights emitted from the plurality of laser light sources arranged at various positions to one location. In this case, each of the plurality of laser lights reaches the one location from various directions. In a case where the plurality of laser light sources includes the multi-emitter laser light source, the luminous flux emitted from the multi-emitter laser light source is split as described above, and therefore tends to exceed the range of an angle of incidence allowed at the one location. For example, the luminous flux emitted from the multi-emitter laser light source exceeds the range of an angle of incidence allowable for an integrator optical system, and a loss of the luminous flux may occur.

In order to reduce the angle of incidence on the integrator optical system (for example, a fly-eye lens), it is conceivable to increase the distance from each laser light source to an incident surface of the integrator optical system. However, increasing the distance means that the size of the light source device increases, and can hinder, for example, miniaturization of the projection type image display.

In the light source device according to the present technology, as described above, it is possible to prevent the luminous flux of the laser light emitted from the multi-emitter laser light source from being split. Therefore, the range of the angle of incidence can be easily satisfied, and the loss of the luminous flux can be prevented.

(2) First Example of First Embodiment (Projection Type Display Device Including Light Source Device According to Present Technology)

An example of a light source device according to the present technology will be described below with reference to FIGS. 1A, 1B, 1C, 1D, 1E, 1F, and 1G. FIG. 1A is an example of a schematic view of a projection type display device 100 including the light source device according to the present technology. FIG. 1B is a view in which optical paths of laser lights emitted from respective laser light sources are added to FIG. 1A. FIGS. 1C, 1D, 1E, 1F, and 1G are views illustrating only a laser light source unit of the light source device. The projection type display device 100 illustrated in these views is a color liquid crystal projection type display device that includes a single-panel spatial modulation element (for example, a reflective liquid crystal panel) for red (R), green (G), and blue (B) colored lights. The projection type display device projects image display light onto an arbitrary projection surface, and the image projected on the projection surface can be visually recognized by humans. Further, in FIG. 1B, the optical paths of the colored lights of R, G, and B are represented by dotted lines, alternate long and short dash lines, and solid lines, respectively, and these lines all represent substantially the center of the optical path of each laser light. Furthermore, in FIG. 1B, the optical paths of a plurality of laser lights synthesized by, for example, a dichroic mirror or the like are illustrated side by side in parallel, but the synthesized laser lights overlap in an actual device. The optical paths in other drawings are configured similarly.

As illustrated in FIG. 1A, the projection type display device 100 includes a laser light source unit 110, an integrator optical system 120, a polarizing beam splitter (PBS) prism 130, a two-dimensional spatial modulation element 140, and a projection lens (projection means) 150. The laser light source unit 110 constitutes a light source device according to the present technology.

Figure 1C:
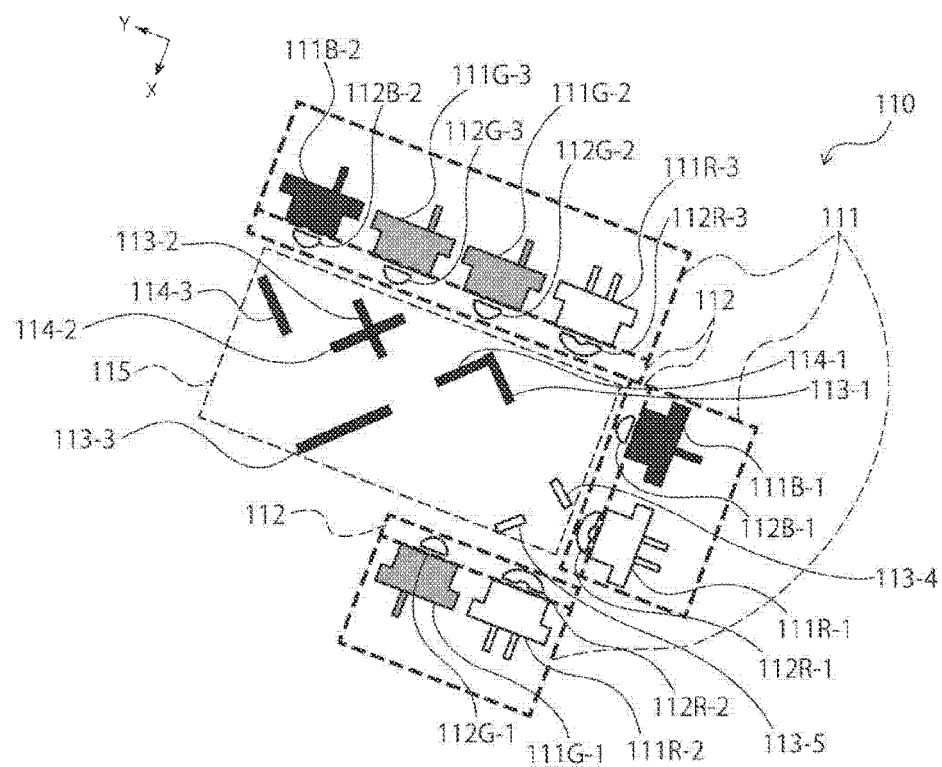
FIG. 1C is a view illustrating a configuration of a laser light source unit.

In FIG. 1C, only the laser light source unit 110 in FIG. 1A is illustrated. As illustrated in FIG. 1C, the laser light source unit 110 includes a laser light source group 111, a collimator lens group 112, and a light guide unit 115.

The laser light source group 111 includes three laser light sources 111R-1, 111R-2, and 111R-3 that emit red colored lights, three laser light sources 111G-1, 111G-2, and 111G-3 that emit green colored lights, and two laser light sources 111B-1 and 111B-2 that emit blue colored lights. These laser light sources can be semiconductor lasers.

Hereinafter, the laser light sources 111R-1, 111R-2, and 111R-3 are also collectively referred to as a laser light source group 111R. The laser light sources 111G-1, 111G-2, and 111G-3 are also collectively referred to as a laser light source group 111G. The laser light sources 111B-1 and 111B-2 are also collectively referred to as a laser light source group 111B.

The laser light sources 111R-1, 111R-2, and 111R-3 are all multi-emitter laser light sources. A multi-emitter laser light source is a laser light source having a plurality of light emission points (emitters). In the present technology, a multi-emitter laser light source known in the art may be used as the multi-emitter laser light source. The number of emitters (light emission points) of the multi-emitter laser light source used in the present technology is two or more, for example, two to ten, and in particular, two to five.

In FIG. 1A, a laser light source that emits a red laser light is used as the multi-emitter laser light source, but a multi-emitter laser light source may be used as a laser light source that emits another color (for example, green or blue, or the like).

In FIG. 1A, the total number of multi-emitter laser light sources is three, but the number of multi-emitter laser light sources included in the light source device of the present technology (particularly the number of multi-emitter laser light sources that emit red colored lights) may be at least one, for example one to ten, especially one to five.

According to one embodiment of the present technology, the number of multi-emitter laser light sources included in the light source device of the present technology (particularly the number of multi-emitter laser light sources that emit red colored lights) is a plurality (two or more) and can be, for example, two to ten, more particularly two to five. Thus, it is possible to increase brightness of the projected image.

Figure 1D:
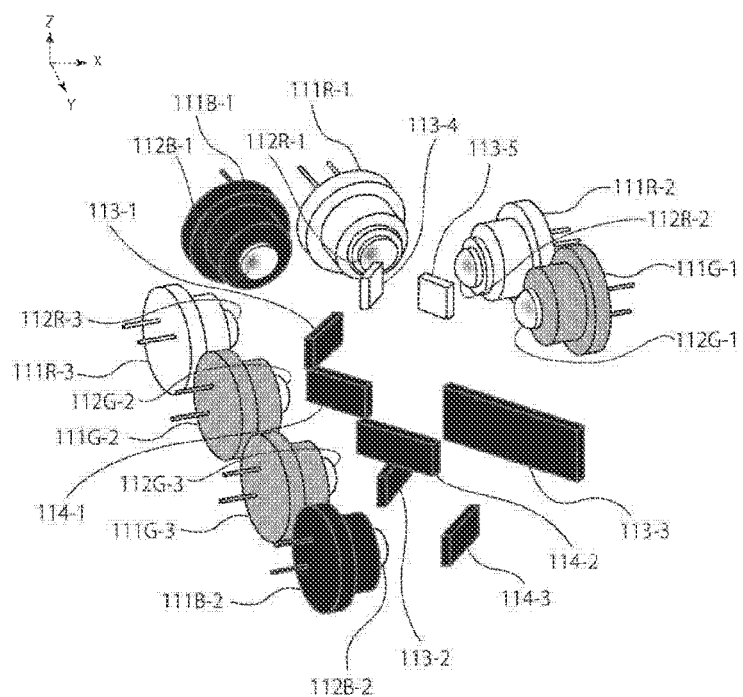
FIG. 1D is a perspective view of the laser light source unit.

In this embodiment, the plurality of multi-emitter laser light sources may be arranged so that the traveling direction of the substantially central portion of each laser light on the emission surface of each of these light sources shares one plane. For example, the laser light source group 111R in FIGS. 1C and 1D is arranged so that the traveling direction of the substantially central portion of the laser light on each emission surface of the laser light source group 111R shares one plane.

Alternatively, in this embodiment, the plurality of multi-emitter laser light sources may be arranged so that the traveling direction of the substantially central portion of the laser light on the emission surface of each of these light sources does not share one plane. For example, one or two of the laser light source group 111R illustrated in FIGS. 1C and 1D may be arranged so as to be on a front side or a back side of the paper surface of FIG. 1C. For example, if the paper surface of FIG. 1C is an XY plane and front side and back side directions perpendicular to the XY plane are Z-axis directions as illustrated in FIG. 1D, the laser light source group 111R can be arranged so that the traveling direction of one or two laser lights on the emission surface does not share the XY plane. By shifting the position of the laser light source in the Z-axis direction in this manner, the light source device can be made compact in the XY plane, that is, a spread of the device size in a footprint direction can be suppressed.

The laser light sources 111G-1, 111G-2, and 111G-3, and the laser light sources 111B-1 and 111B-2 are wide-emitter laser light sources. The laser light source groups 111G and 111B are non-multi-emitter laser light sources in the present technology.

In FIG. 1A, the wide-emitter laser light sources are used as the non-multi-emitter laser light sources, but other types of non-multi-emitter laser light sources may be used. In the present technology, a non-multi-emitter laser light source may be, for example, a single-emitter laser light source, particularly a wide-emitter laser light source.

In FIG. 1A, the laser light source that emits a blue or green laser light is used as the non-multi-emitter laser light source, but a non-multi-emitter laser light source may be used as the laser light source that emits another color (for example, red or the like).

In FIG. 1A, the total number of non-multi-emitter laser light sources is five, but the number of multi-emitter laser light sources included in the light source device of the present technology may be at least one, for example, one to twenty, particularly one to ten.

According to one embodiment of the present technology, the number of non-multi-emitter laser light sources included in the light source device of the present technology (particularly the total number of non-multi-emitter laser light sources that emit blue or green colored lights) is a plurality (two or more) and can be, for example, 2 to 20, more particularly 2 to 10. Thus, it is possible to increase brightness of the projected image. For example, the number of non-multi-emitter laser light sources that emit blue colored lights is a plurality (two or more) and can be, for example, 2 to 10, more particularly 2 to 5, and the number of non-multi-emitter laser light sources that emit green colored lights is a plurality (two or more) and can be, for example, 2 to 10, more particularly 2 to 5.

In this embodiment, the plurality of non-multi-emitter laser light sources may be arranged so that the traveling direction of the substantially central portion of the laser light on the emission surface of each of these light sources shares one plane.

Alternatively, in this embodiment, the plurality of non-multi-emitter laser light sources may be arranged so that the traveling direction of the substantially central portion of each laser light on the emission surface of each of these light sources does not share one plane. For example, as illustrated in the perspective views of FIGS. 1D and 1F, a position of the laser light source 111G-2 in the Z-axis direction is different from positions of the laser light sources 111G-3 and 111B-2 in the Z-axis direction, that is, the traveling direction of the substantially central portion of the laser light on the emission surface of the laser light source 111G-2 does not share the plane formed by the traveling directions of the laser lights on the emission surfaces of the laser light sources 111G-3 and 111B-2. By arranging the plurality of laser light sources so that the positions in the Z-axis direction are different in this manner, the light source device can be made compact in the XY plane. Along with this, a reflection mirror and a dichroic mirror in the light guide unit 115 described below may be arranged so as to be offset in the Z-axis direction.

The collimator lens group 112 includes collimator lenses 112R-1, 112R-2, and 112R-3 arranged immediately before the three laser light sources 111R-1, 111R-2, and 111R-3 that emit red colored lights, respectively, collimator lenses 112G-1, 112G-2, and 112G-3 arranged immediately before the three laser light sources 111G-1, 111G-2, and 111G-3 that emit green colored lights, respectively, and collimator lenses 112B-1 and 112B-2 arranged immediately before the two laser light sources 111B-1 and 111B-2 that emit blue colored lights, respectively.

Hereinafter, the collimator lenses 112R-1, 112R-2, and 112R-3 are also collectively referred to as a collimator lens group 112R. The collimator lenses 112G-1, 112G-2, and 112G-3 are also collectively referred to as a collimator lens group 112G. The collimator lenses 112B-1 and 112B-2 are also collectively referred to as a collimator lens group 112B.

The collimator lenses 112R-1, 112R-2, and 112R-3 adjust laser lights emitted from the laser light sources 111R-1, 111R-2, and 111R-3, which are multi-emitter laser light sources, respectively.

Each of the collimator lens group 112R may be arranged so that each laser light emitted from each of the laser light source group 111R is adjusted before being combined with another laser light.

The collimator lens 112R-1 is a lens having a concave cylindrical surface and a convex aspherical surface. The collimator lens 112R-1 is arranged so that the concave cylindrical surface is arranged on the laser light source 111R-1 side (the incident surface of the laser light), and the convex aspherical surface is arranged on an opposite side (the emitting surface of the laser light) of the laser light source 111R-1 side. That is, as illustrated in FIG. 1B, the laser light emitted from the laser light source 111R-1 enters the collimator lens 112R-1 from the concave cylindrical surface, travels in the collimator lens 112R-1, and then goes out of the collimator lens 112R-1 from the convex aspherical surface.

Similarly, the collimator lenses 112R-2 and 112R-3 are lenses having a concave cylindrical surface and a convex aspherical surface. The collimator lenses 112R-2 and 112R-3 are arranged so that the concave cylindrical surface is arranged on the laser light source side and the convex aspherical surface is arranged on an opposite side of the laser light source side.

For example, as illustrated in FIG. 1A, the collimator lenses 112R-1, 112R-2, and 112R-3 may be all arranged immediately before the light emitting surfaces of the laser light sources 111R-1, 111R-2, and 111R-3. In the present technology, the distance between the light emitting surface of the multi-emitter laser light source and the emitting surface (top of the convex aspherical surface) of the collimator lens arranged immediately before the light emitting surface may be appropriately set by a person skilled in the art depending on a shape of a desired far field pattern, and may be, for example, 2.5 mm to 4.5 mm, preferably 2.8 mm to 4.0 mm, and more preferably 3.1 mm to 3.5 mm.

As described above, the light source device according to the present technology includes a collimator lens that adjusts a laser light emitted from the multi-emitter laser light source, and the collimator lens has at least one cylindrical surface. The collimator lens having the cylindrical surface can prevent a luminous flux of the laser light emitted from the multi-emitter laser light source from being split. In the present technology, the collimator lens may have, for example, one or two cylindrical surfaces, and in particular may have one cylindrical surface. For example, in the present technology, the cylindrical surface may be a concave cylindrical surface. In a case where the cylindrical surface is a concave cylindrical surface, the concave cylindrical surface may be provided on an incident surface of the laser light. Preferably, the collimator lens and the multi-emitter laser light source may be arranged so that a line forming a top of the cylindrical surface (ridge of the top) is orthogonal to an arrangement direction of the plurality of emitters of the multi-emitter laser light source.

According to one embodiment of the present technology, the collimator lens that adjusts the laser light emitted from the multi-emitter laser light source may have one concave cylindrical surface. A radius of curvature R of the concave cylindrical surface is preferably −3 mm to −0.5 mm, more preferably −2.9 mm to −1 mm, still more preferably −2.5 mm to −1 mm, and particularly preferably −2.2 mm to −1 mm. By the concave cylindrical surface having such a radius of curvature, it becomes easy to prevent the luminous flux of the laser light emitted from the multi-emitter laser light source from being split.

According to another embodiment of the present technology, the collimator lens that adjusts the laser light emitted from the multi-emitter laser light source may have one convex cylindrical surface. A radius of curvature R of the convex cylindrical surface is preferably 0.5 mm to 3 mm, more preferably 1 mm to 2.9 mm, still more preferably 1 mm to 2.5 mm, and particularly preferably 1 mm to 2.2 mm. By the convex cylindrical surface having such a radius of curvature, it becomes easy to prevent the luminous flux of the laser light emitted from the multi-emitter laser light source from being split.

Furthermore, a combination of the radius of curvature and an average optical path length and/or a refractive index described below makes it easier to prevent the luminous flux of the laser light emitted from the multi-emitter laser light source from being split.

The collimator lenses 112G-1, 112G-2, and 112G-3 adjust laser lights emitted from the laser light sources 111G-1, 111G-2, and 111G-3, respectively.

Each of the collimator lens group 112G may be arranged so that each laser light emitted from each of the laser light sources 111G is adjusted before each laser light is color-synthesized with another laser light. For example, as illustrated in FIG. 1A, the collimator lenses 112G-1, 112G-2, and 112G-3 are all arranged immediately before the light emitting surfaces of the laser light sources 111G-1, 111G-2, and 111G-3.

The collimator lens 112G-1 is a lens having a flat surface and a convex aspherical surface. The collimator lens 112G-1 is arranged so that the flat surface is arranged on the laser light source 111G-1 side and the convex aspherical surface is arranged on a side opposite to the laser light source 111G-1 side. That is, as illustrated in FIG. 1B, the laser light emitted from the laser light source 111G-1 enters the collimator lens 112G-1 from the flat surface, travels in the collimator lens 112G-1, and then goes out of the collimator lens 112G-1 from the convex aspherical surface.

Similarly, the collimator lenses 112G-2 and 112G-3 are lenses having a flat surface and a convex aspherical surface. The collimator lenses 112G-1 and 112G-3 are arranged so that the flat surface is arranged on the laser light source side and the convex aspherical surface is arranged on the side opposite to the laser light source side.

Because the laser light source group 111G is the wide-emitter laser light source, the laser light emitted from each of the laser light source group 111G can be adjusted to be a substantially parallel light by the collimator lens group 112G.

The collimator lenses 112B-1 and 112B-2 adjust laser lights emitted from the laser light sources 111B-1 and 111B-2, respectively.

Each of the collimator lens group 112B may be arranged so that each laser light emitted from each of the laser light source group 111B is adjusted before color synthesis of each laser light with another laser light. For example, as illustrated in FIG. 1A, both the collimator lenses 112B-1 and 112B-2 may be arranged immediately before light emitting surfaces of the laser light sources 111B-1 and 111B-2.

The collimator lens 112B-1 is a lens having a flat surface and a convex aspherical surface. The collimator lens 112B-1 is arranged so that the flat surface is arranged on the laser light source 111B-1 side and the convex aspherical surface is arranged on a side opposite to the laser light source 111B-1 side. That is, as illustrated in FIG. 1B, the laser light emitted from the laser light source 111B-1 enters the collimator lens 112B-1 from the flat surface of the collimator lens 112B-1 and travels in the collimator lens 112B-1, and then goes out of the collimator lens 112B-1 from the convex surface.

Similarly, the collimator lens 112B-2 is a lens having a flat surface and a convex aspherical surface. The collimator lens 112B-1 is arranged so that the flat surface is arranged on the laser light source side and the convex aspherical surface is arranged on a side opposite to the laser light source side.

Because the laser light source group 111B is the wide-emitter laser light source, the laser light emitted from each of the laser light source group 111B can be adjusted to be a substantially parallel light by the collimator lens group 112B.

The light guide unit 115 includes a dichroic mirror group 113 and a reflection mirror group 114.

The dichroic mirror group 113 has an optical characteristic of being capable of color-synthesizing laser lights of different colored lights.

Figure 1E:
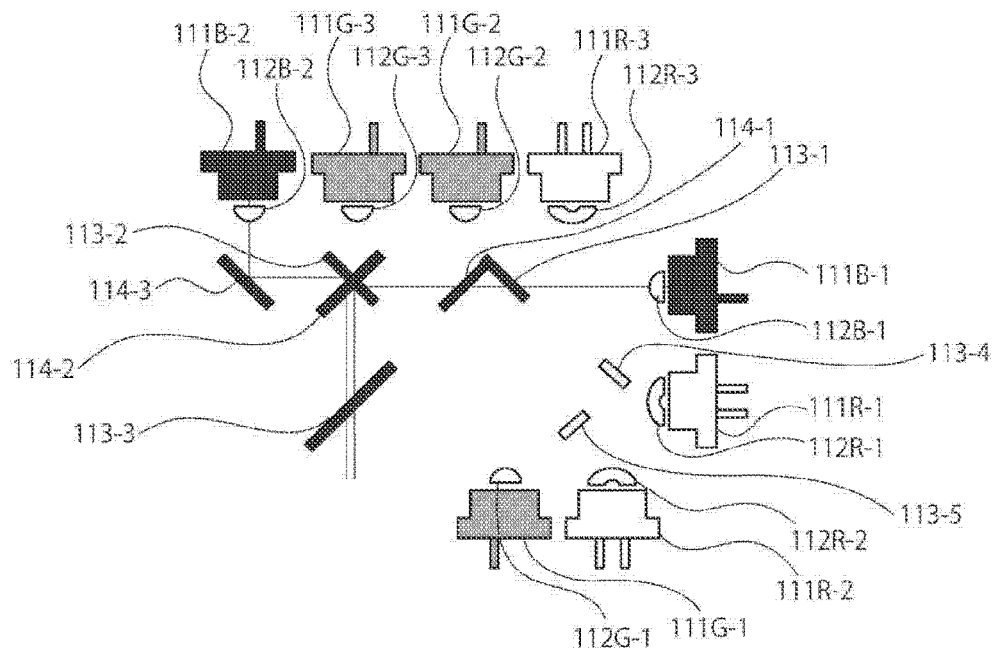
FIG. 1E is a view illustrating optical paths of blue laser lights in the laser light source unit.
Figure 1F:
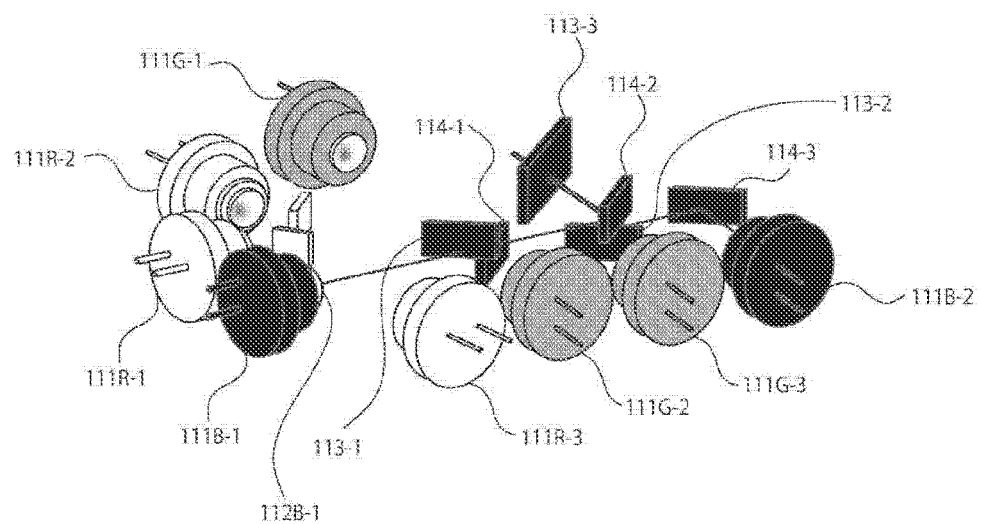
FIG. 1F is a perspective view illustrating the optical paths of the blue laser lights in the laser light source unit.

The dichroic mirror 113-1 has optical characteristics to transmit a blue laser light and reflect a green laser light. As illustrated in FIGS. 1E and 1F, the dichroic mirror 113-1 transmits a blue laser light emitted by the laser light source 111B-1. Furthermore, the dichroic mirror 113-1 reflects a green laser light emitted from the laser light source 111G-1 as illustrated in FIG. 1B. In this manner, the dichroic mirror 113-1 color-synthesizes the blue laser light emitted from the laser light source 111B-1 and the green laser light emitted from the laser light source 111G-1.

The dichroic mirror 113-2 has optical characteristics to reflect a blue laser light and transmit a green laser light. As illustrated in FIGS. 1B and 1E, the dichroic mirror 113-2 transmits a green laser light emitted from the laser light source 111G-3 and reflects a blue laser light emitted from the laser light source 111B-2. In this manner, the dichroic mirror 113-2 color-synthesizes the green laser light emitted from the laser light source 111G-3 and the blue laser light emitted from the laser light source 111B-2.

The dichroic mirror 113-3 has optical characteristics to reflect a red laser light and transmit a green laser light and a blue laser light. As illustrated in FIG. 1B, the dichroic mirror 113-3 having the optical characteristics color-synthesizes the red laser light emitted from the laser light source group 111R and the color-synthesized laser light emitted from the laser light source groups 111G and 111B.

The dichroic mirror 113-4 has optical characteristics to reflect a red laser light and transmit laser light of other colored light. A red laser light emitted from the laser light source 111R-2 is reflected by the dichroic mirror 113-4 and travels to the dichroic mirror 113-3.

The dichroic mirror 113-5 has optical characteristics to reflect a red laser light and transmit laser light of other colored light. A red laser light emitted from the laser light source 111R-3 is reflected by the dichroic mirror 113-5 and travels to the dichroic mirror 113-3.

According to one embodiment of the present technology, the reflective surface of the red laser light of the dichroic mirror 113-4 and/or dichroic mirror 113-5 may be a concave cylindrical surface. That is, the dichroic mirror 113-4 and/or dichroic mirror 113-5 may be a cylindrical mirror. By providing the cylindrical mirror on the optical path of the laser light adjusted by the collimator lens 112R-2 or 112R-3 in this manner, in a case where the optical path length from the laser light source to the integrator optical system changes, it is possible to adjust the luminous flux width on a speed axis side, which cannot be compensated by the collimator lens 112R-2 or 112R-3, by adjusting the curvature of the concave cylindrical surface. Furthermore, by adjusting the curvature of the cylindrical mirror, it becomes easy to adjust the far field pattern in the integrator optical system according to the change in the optical path length. That is, by optimizing the curvature, it is possible to optimize the far field pattern, and it is also possible to respond to changes in the optical path length. A radius of curvature of the concave cylindrical surface of the dichroic mirror 113-4 and/or the dichroic mirror 113-5, which is a cylindrical mirror, is preferably $-150$ mm$<R<-5$ mm, more preferably $-100$ mm$<R<-10$ mm.

According to another embodiment of the present technology, a cylindrical lens having a convex cylindrical surface may be used instead of the cylindrical mirror having the concave cylindrical surface. That is, the cylindrical lens can be provided on the optical path of the laser light adjusted by the collimator lens. In a case where this embodiment is applied to the light guide unit illustrated in FIG. 1A, for example, the reflecting surfaces of the dichroic mirrors 113-4 and 113-5 are flat surfaces, and the cylindrical lens can be arranged on optical paths of the laser lights emitted from the laser light sources 111R-2 and/or 111R-3. The red laser lights from these laser light sources enter the cylindrical lens from a surface (for example, a flat surface) opposite to the convex cylindrical surface of the cylindrical lens and exit from the convex cylindrical surface. A radius of curvature of the convex cylindrical surface of the cylindrical lens is preferably 5 mm$<R<150$ mm, more preferably 10 mm$<R<100$ mm.

One or more of the dichroic mirror group 113 may preferably be a dichroic mirror having optical characteristics (polarization characteristics) that improve a deflection ratio of the laser light. The dichroic mirror having the optical characteristics can improve a polarization ratio of the laser light reflected or transmitted by the dichroic mirror, and can form a luminous flux more suitable for image projection, for example.

The reflection mirror group 114 may have optical characteristics to reflect only a laser light of colored light to be reflected, or may have optical characteristics to reflect a laser light of another colored light in addition to the colored light to be reflected.

As illustrated in FIG. 1B, the reflection mirror 114-1 reflects the laser light emitted from the 111G-2 so that the laser light travels to the reflection mirror 114-2.

As illustrated in FIG. 1B, the reflection mirror 114-2 reflects the laser lights emitted from the 111B-1, 111G-1, and 111G-2 so that the laser lights travel to the dichroic mirror 113-3.

As illustrated in FIG. 1B, the reflection mirror 114-3 reflects the laser light emitted from the laser light source 111B-2 so that the laser light travels to the dichroic mirror 113-2.

Figure 1G:
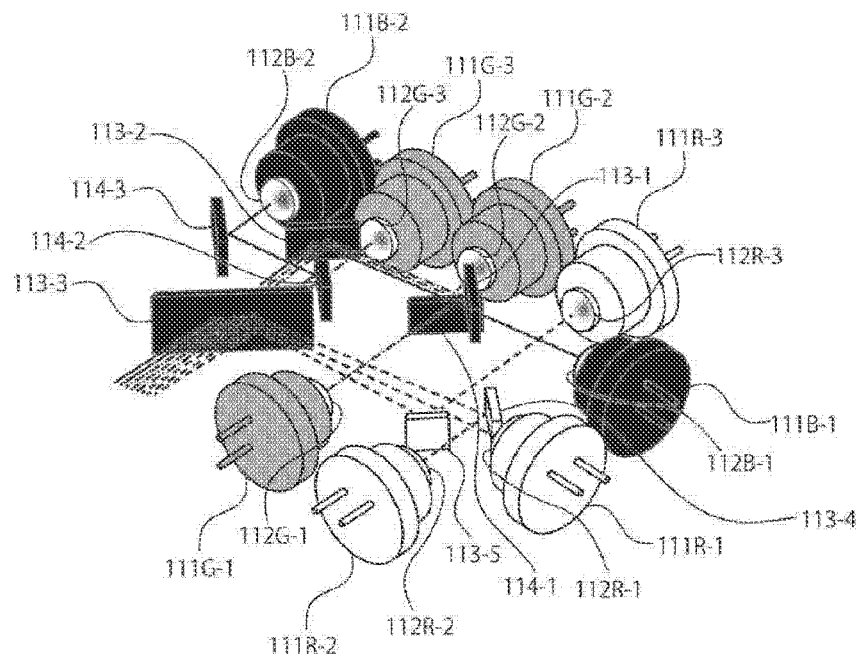
FIG. 1G is a perspective view illustrating optical paths in the laser light source unit.

As illustrated in FIGS. 1D, 1F, and 1G, the dichroic mirror 113-2 and the reflection mirror 114-2 are arranged so as to be offset in the Z-axis direction. Thus, the dichroic mirror 113-2 and the reflection mirror 114-2 are illustrated overlapping on the plan view illustrated in FIG. 1A. The dichroic mirror 113-1 and the reflection mirror 114-1 are configured similarly. By thus arranging the optical components included in the light guide unit so as to be shifted in the Z-axis direction, it is possible to correspond to the laser light source group 111 which is arranged so as to be shifted in the Z-axis direction, and the light source device can be made compact in the XY plane.

As described above, the laser lights emitted from the laser light source groups 111R, 111G, and 111B are aggregated by color synthesis by the light guide unit 115. The luminous flux aggregated by the color synthesis by the light guide unit 115 travels to the integrator optical system 120.

The laser light source group 111R is the multi-emitter laser light source, but the laser light emitted from the laser light source group 111R is adjusted by the collimator lens group 112R having a cylindrical surface, and thus the luminous flux thereof does not split. Thus, uniformity of the illuminance of the luminous flux aggregated by the color synthesis by the light guide unit is high.

Furthermore, in a case where the laser light emitted from the laser light source group 111R is adjusted by the collimator lens group 112R, the shape of the far field pattern of the laser light can be easily adjusted by, for example, moving the collimator lens group 112 in an optical axis direction. Thus, a far field pattern of a multi-emitter laser light source group (laser light source group 111R) and a far field pattern of a non-multi-emitter laser light source group (laser light source groups 111G and 111B) on an incident surface of the integrator optical system 120 can be easily made into substantially the same shape. That is, the light source device of the present technology can be configured such that the far field pattern of the multi-emitter laser light source group and the far field pattern of the non-multi-emitter laser light source group on the incident surface of the integrator optical system can be formed to have substantially the same shape. Such a configuration of the light source device of the present technology also contributes to improvement in uniformity of the illuminance of the luminous flux aggregated by the color synthesis by the light guide unit.

Figure 2:
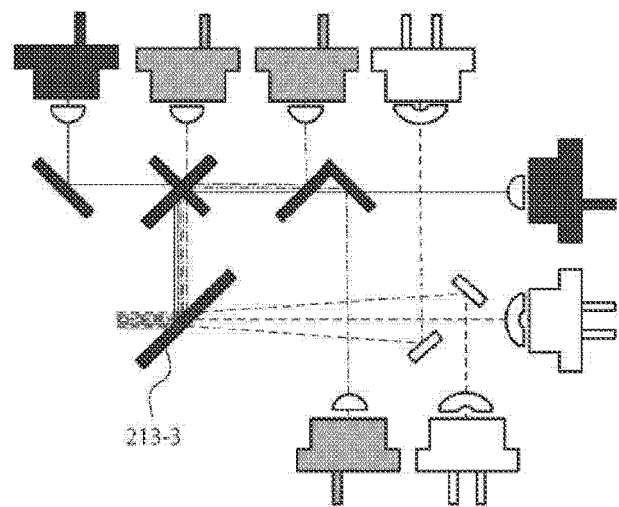
FIG. 2 is a view illustrating another example of a laser light source unit included in the light source device according to the present technology.

In the present technology, the configurations of the laser light source group, the collimator lens group, the dichroic mirror group, and the reflection mirror group included in the laser light source unit are not limited to those illustrated in FIG. 1A. Those skilled in the art can appropriately change the configuration of the laser light source unit. FIG. 2 illustrates another example of a laser light source unit.

The laser light source unit illustrated in FIG. 2 is the same as the laser light source unit illustrated in FIG. 1A except that a dichroic mirror 213-3 having optical characteristics to transmit a red laser light and reflect a green laser light and a blue laser light is used instead of the dichroic mirror 113-3 having optical characteristics to reflect a red laser light and transmit a green laser light and a blue laser light. By changing the optical characteristics of components of the laser light source unit in this manner, the emission direction of luminous flux aggregated by the laser light source unit can be changed.

In the present technology, an average optical path length of the laser light emitted from the laser light source group that emits each colored light included in the light source device is preferably 20 mm or more and 55 mm or less, and more preferably 25 mm or more and 50 mm or less. That is, an average optical path length of the laser light emitted from the laser light source group that emits a red colored light is preferably 20 mm or more and 55 mm or less, and more preferably 25 mm or more and 50 mm or less, an average optical path length of the laser light emitted from the laser light source group that emits a blue colored light is preferably 20 mm or more and 55 mm or less, and more preferably 25 mm or more and 50 mm or less, and an average optical path length of the laser light emitted from the laser light source group that emits a green colored light is preferably 20 mm or more and 55 mm or less, and more preferably 25 mm or more and 50 mm or less.

With respect to the projection type display device 100 illustrated in FIGS. 1A, 1B, 1C, 1D, 1E, 1F, and 1G, the average optical path length is an average (particularly simple average) of optical path lengths from a light emission point of the laser light source group that emits each colored light to the incident surface of the integrator optical system 120. For example, in a case where the laser light source unit includes a plurality of laser light sources that emits a red colored light, the average (particularly simple average) of distances from respective light emission points of the plurality of laser light sources to the incident surface of the integrator optical system is the average optical path length of the laser light source group that emits a red colored light.

Note that regarding a projection type display device 300 illustrated in (3) below, the average optical path length is an average (particularly simple average) of optical path lengths up to an incident surface of a second integrator optical system 360 (fly-eye lens 361) from a light emission point of the laser light source group that emits each colored light.

By arranging the laser light source group in the light source device so as to have the average optical path length within the above numerical range, the light source device can be made compact, and moreover, loss of the luminous flux that does not satisfy an angle of incidence limitation of the integrator optical system can be avoided. The average optical path length within this numerical range can also contribute to suppressing division of the luminous flux emitted from the multi-emitter laser light source.

In the present technology, in a case where there is only one laser light source that emits a certain colored light, the optical path length of the laser light source may be preferably 25 mm or less, and more preferably 20 mm or less. For example, in a case where the number of laser light sources that emit red colored lights is one, the optical path length from a light emission point of the laser light source to the incident surface of the integrator optical system is preferably 25 mm or less, and more preferably 20 mm or less. The laser light sources of other colored lights are configured similarly. Thus, the light source device can be made compact, and moreover, loss of the luminous flux that does not satisfy the angle of incidence limitation of the integrator optical system can be avoided. The optical path length within this numerical range can also contribute to suppressing division of the luminous flux emitted from the multi-emitter laser light source.

In a case where the average optical path length or the optical path length is within the numerical range mentioned above, refractive index nd of the collimator lens that adjusts the laser light emitted from the multi-emitter laser light source is preferably 1.70 to 1.85, and more preferably 1.72 to 1.82.

The integrator optical system 120 uniformizes the luminous flux aggregated by the color synthesis by the light guide unit and converts the luminous flux into a substantially parallel light. Furthermore, the integrator optical system 120 is conjugate with the two-dimensional spatial modulation element 140. The light source device of the present technology may include an integrator optical system 120 in addition to the laser light source unit described above.

According to a preferred embodiment of the present technology, an angle of incidence θ (°) of the luminous flux to the integrator optical system 120 may be within a range represented by the following formula (1), $$\theta < 180/\pi \cdot \sin^{-1}(NA) \qquad (1)$$

(where NA=1/(2*F #), F #=EFL/D, F # is a projection lens of the projection type display device, EFL is a focal length of the projection lens of the projection type display device, and D is an aperture diameter of the projection lens).

By configuring the projection type display device so that the angle of incidence θ of the luminous flux is within this range, loss of the luminous flux is reduced.

The integrator optical system 120 includes, for example, a fly-eye lens or a rod lens. From the viewpoint of miniaturization, the integrator optical system 120 preferably includes a fly-eye lens. The integrator optical system 120 includes, for example, a pair of fly-eye lenses and a condenser lens.

Of the pair of fly-eye lenses, a first fly-eye lens on the light guide unit side splits the luminous flux into the number of microlenses constituting the first fly-eye lens. Each of the microlenses may have a shape substantially similar to the shape of the two-dimensional spatial modulation element 140. Each of the split luminous fluxes is condensed on each of microlenses constituting a second fly-eye lens on the two-dimensional spatial modulation element 140 side. Each of the luminous fluxes having passed through the light guide unit and the second fly-eye lens is converted into a substantially parallel light by the condenser lens. As described above, the luminous flux aggregated by the color synthesis by the light guide unit is uniformized and converted into a substantially parallel light by the pair of fly-eye lenses and the condenser lens. The substantially parallel light thus obtained travels to the polarizing beam splitter prism 130.

As the polarizing beam splitter prism 130, the two-dimensional spatial modulation element 140, and the projection lens 150, those known in the art may be used.

As the polarizing beam splitter prism 130, for example, a prism in which two right-angled prisms having a dielectric multilayer film formed on a joint surface are laminated may be used. The polarizing beam splitter prism 130 can split the substantially parallel light traveling from the integrator optical system 120 into a P-polarized light and an S-polarized light. The split luminous flux travels to the two-dimensional spatial modulation element 140.

The two-dimensional spatial modulation element 140 may be, for example, a reflective liquid crystal element (LCOS, Liquid crystal on silicon). The split luminous flux is modulated by the two-dimensional spatial modulation element 140 to form an image display light.

The projection lens 150 magnifies and projects the image display light formed by the two-dimensional spatial modulation element 140 onto an arbitrary projection surface.

As described above, uniformity of illuminance of the luminous flux aggregated by the color synthesis by the light guide unit is high. Therefore, uniformity of illuminance of the magnified projected image is also high.

(3) Second Example of First Embodiment (Projection Type Display Device Including Light Source Device According to Present Technology)

The light source device according to the present technology may further include a second integrator optical system in order to further increase uniformity of illuminance of the laser light. The second integrator optical system is particularly suitable for improving uniformity of illuminance of the laser light (particularly uniformity of light reaching the two-dimensional spatial modulation element) particularly in a case of using two or more laser light sources of one color.

Furthermore, the light source device according to the present technology may include an optical element for polarization in order to further improve the polarization ratio of the luminous flux aggregated by color synthesis.

Hereinafter, a light source device according to the present technology including the second integrator optical system and the optical element for polarization will be described with reference to FIG. 3.

Figure 3:
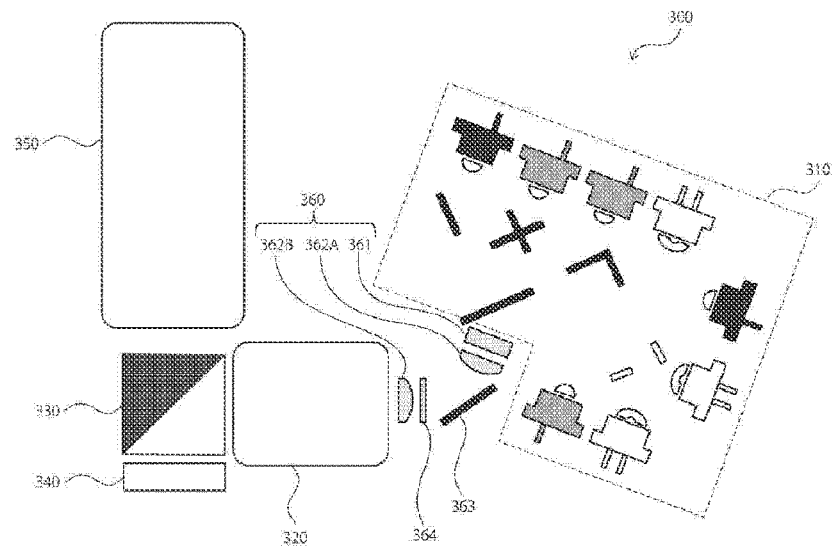
FIG. 3 is a view illustrating a configuration example of the projection type display device including the light source device according to the present technology.

FIG. 3 is an example of a schematic view of a projection type display device 300 including a light source device according to the present technology. As illustrated in FIG. 3, the projection type display device 300 includes a laser light source unit 310, an integrator optical system 320, a polarizing beam splitter (PBS) prism 330, a two-dimensional spatial modulation element 340, and a projection lens (projection means) 350.

The projection type display device 300 further includes a second integrator optical system 360 for uniformizing illuminance of the luminous flux. The second integrator optical system 360 includes a fly-eye lens 361 and relay lenses 362A and 362B. The second integrator optical system 360 is arranged on an optical path between the light guide unit and the integrator optical system 320.

The projection type display device 300 may further include a polarizing mirror 363 and a speckle canceller 364, which are optical elements for polarization.

The laser light source unit 310, the integrator optical system 320, the polarizing beam splitter prism 330, the two-dimensional spatial modulation element 340, and the projection lens (projection means) 350 in FIG. 3 are the same as the laser light source unit 110, the integrator optical system 120, the polarizing beam splitter prism 130, the two-dimensional spatial modulation element 140, and the projection lens (projection means) 150 described in the above "(2) First example of first embodiment (light source device)", and the description thereof also applies to FIG. 3. Therefore, the description of these components will be omitted.

The laser light source unit 310 includes a multi-emitter laser light source, but as described in the above "(2) First example of first embodiment (projection type display device including light source device according to present technology)", the luminous flux of a laser light emitted by the multi-emitter laser light source is not split by the collimator lens group having a cylindrical surface. Thus, uniformity of the illuminance of the luminous flux aggregated by the color synthesis by the light guide unit is high. Therefore, uniformity of illuminance of the magnified projected image is also high.

Furthermore, the shape of the far field pattern of the laser light emitted from the multi-emitter laser light source group can be easily adjusted by moving the collimator lens group having a cylindrical surface in the optical axis direction. Thus, a far field pattern of a multi-emitter laser light source group and a far field pattern of a non-multi-emitter laser light source group on an incident surface of the second integrator optical system 360 (particularly the fly-eye lens 361) can be easily made into substantially the same shape. That is, the light source device of the present technology can be configured such that the far field pattern of the multi-emitter laser light source group and the far field pattern of the non-multi-emitter laser light source group on the incident surface can be formed to have substantially the same shape. Such a configuration of the light source device of the present technology also contributes to improvement in uniformity of the illuminance of the luminous flux aggregated by the color synthesis by the light guide unit.

The fly-eye lens 361 makes illuminance of the luminous flux aggregated by color synthesis by the light guide unit uniform. The luminous flux uniformize by the fly-eye lens 361 travels to the integrator optical system 120 via the relay lenses 362A and 362B.

The fly-eye lens 361 may be, for example, a lens having two fly-eye surfaces. As the lens, for example, an integrated fly eye or a double fly eye may be used. The double fly eye may have a configuration including two fly-eye lenses, and a second fly eye lens on the integrator optical system 120 side is arranged at a focal position of a first fly eye lens on the light guide unit side. An integrated fly-eye is a lens in which a space between two fly-eye lenses is filled with, for example, glass or the like, that is, fly-eye surfaces are formed on both end faces of a quadrangular prism or a cylinder, for example. Preferably, the two fly-eye surfaces included in the fly-eye lens 361 have the same radius of curvature.

Preferably, an angle of incidence θ (°) of luminous flux on the fly-eye lens 361 (fly-eye surface on the light guide unit side) satisfies the following formula (2), $$\theta < 180/\pi \cdot \tan^{-1}(h/f) \quad (2)$$

(where $f=nR^2/((n-1)(2nR-t(n-1)))$ (in a case of same R on both sides), θ is the angle of incidence of the luminous flux on the fly-eye lens, h is an image height (mm) of a cell of one fly-eye lens, f is a focal length (mm) of the fly-eye lens, n is a refractive index of the fly-eye lens, R is a radius of curvature (mm) of the fly-eye lens, and t: core thickness (mm) of the fly-eye lens).

Loss of the luminous flux can be avoided by laying out the laser light source and mirrors in the light source device so that the angle of incidence θ satisfies the numerical range of the formula (2).

The relay lenses 362A and 362B can be, for example, plano-convex aspherical lenses. For example, a flat surface of the relay lens 362A may be arranged so as to face the fly-eye lens 361, and a convex surface of the relay lens 362A may face the relay lens 362B side. Furthermore, a convex surface of the relay lens 362B may be arranged so as to face the relay lens 362A side, and a flat surface of the relay lens 362B may be arranged so as to face the integrator optical system 120.

According to a preferred embodiment of the present technology, the luminous flux aggregated by the light guide unit is reflected by the polarizing mirror 363. This improves the polarization ratio of the luminous flux. The polarizing mirror 363 is arranged so that the luminous flux aggregated by the light guide unit is incident on the polarizing mirror 363 at substantially Brewster's angle. By configuring the light source device according to the present technology in this manner, the polarization ratio of the luminous flux can be further improved.

The speckle canceller 364 may include, for example, a diffuser plate and an actuator. Speckles can be reduced by moving the diffuser plate with the actuator. The speckle canceller 364 may be arranged at a position other than the position illustrated in FIG. 3, or may not be included in the projection type display device 300. The speckles may be canceled by moving the projection surface on which the image display light from the projection type display device 300 is projected. Techniques known to those skilled in the art for reducing speckles may be used in the present technology.

As described above, the second integrator optical system 360 and the polarizing mirror 363 can further improve uniformity of illuminance of the luminous flux and further improve the polarization ratio. Moreover, the speckle canceller 364 also reduces speckles. With these configurations, a better image is projected.

(4) Third Example Of First Embodiment (Another Example of Laser Light Source Unit)

In the light source device described in (2) and (3) above, the collimator lens arranged immediately before the multi-emitter laser light source has a cylindrical surface, and splitting of the luminous flux emitted from the laser light source into two or more is prevented by the cylindrical surface. The collimator lens having a cylindrical surface does not have to be arranged immediately before the multi-emitter laser light source.

Figure 4A:
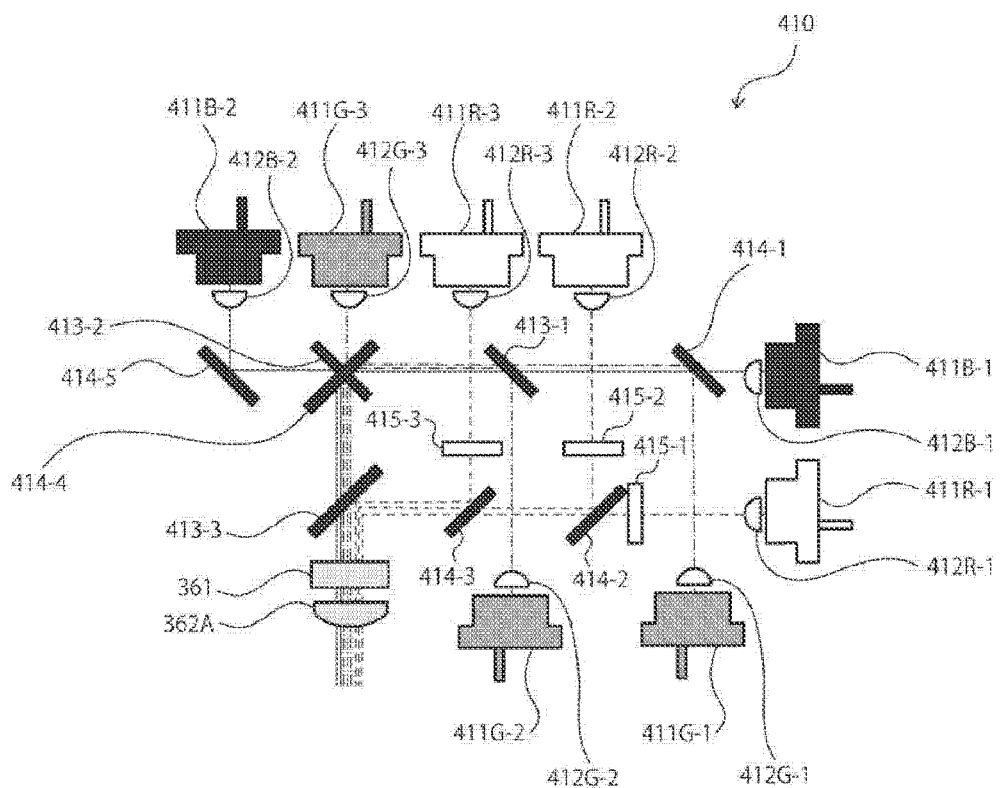
FIG. 4A is a view illustrating another example of the laser light source unit.
Figure 14A:
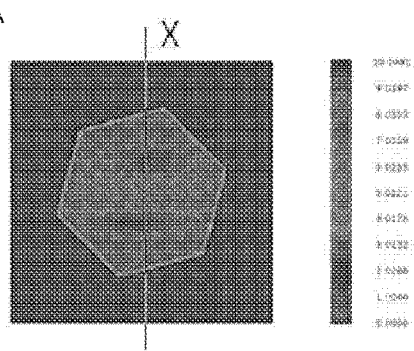
FIGS. 14A and 14B are diagrams illustrating results of a simulation for confirming the illuminance distribution of an image formed by a second integrator optical system in the projection type display device.
Figure 14B:
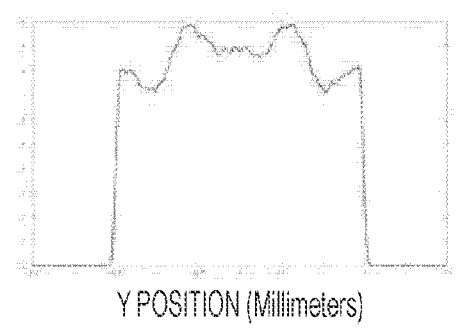

According to one embodiment of the present technology, the collimator lens having a cylindrical surface may be arranged at any position on the optical path from an emitting port of one multi-emitter laser light source to a position where it is aggregated with a laser light emitted by another laser light source. For example, the collimator lens that is a lens having a flat surface and a convex aspherical surface may be arranged immediately before the multi-emitter laser light source, and the collimator lens having the cylindrical surface may be further provided at any position from the collimator lens to the position where it is aggregated with a laser light from another laser light source. Hereinafter, an example of this embodiment will be described with reference to FIGS. 4A and 4B. FIG. 4A is an example of a schematic view of a laser light source unit 410 included in the light source device according to the present technology. FIGS. 14A and 14B are perspective views of the laser light source unit 410.

As illustrated in FIG. 4A, the laser light source unit 410 includes three laser light sources 411R-1, 411R-2, and 411R-3 that emit red colored lights, three laser light sources 411G-1, 411G-2, and 411G-3 that emit green colored lights, and two laser light sources 411B-1 and 411B-2 that emit blue colored lights. These laser light sources can be semiconductor lasers.

Hereinafter, these laser light sources are also collectively referred to as a laser light source group 411. Furthermore, the laser light sources 411R-1, 411R-2, and 411R-3 are also collectively referred to as a laser light source group 411R. The laser light sources 411G-1, 411G-2, and 411G-3 are also collectively referred to as a laser light source group 411G.

The laser light sources 411B-1 and 411B-2 are also collectively referred to as a laser light source group 411B.

The laser light source group 411R is a multi-emitter laser light source. All of the laser light source group 411G and the laser light source group 411B are wide-emitter laser light sources. The laser light source groups 411G and 411B correspond to the non-multi-emitter laser light source in the present technology.

As illustrated in FIG. 4A, the laser light source unit 410 includes collimator lenses 412R-1, 412R-2, and 412R-3 arranged immediately before the three laser light sources 411R-1, 411R-2, and 411R-3 that emit red colored lights, respectively, collimator lenses 412G-1, 412G-2, and 412G-3 arranged immediately before the three laser light sources 411G-1, 411G-2, and 411G-3 that emit green colored lights, respectively, and collimator lenses 412B-1 and 412B-2 arranged immediately before the two laser light sources 411B-1 and 411B-2 that emit blue colored lights, respectively.

Hereinafter, these collimator lenses are also collectively referred to as a collimator lens group 412. Furthermore, the collimator lenses 412R-1, 412R-2, and 412R-3 are also collectively referred to as a collimator lens group 412R. The collimator lenses 412G-1, 412G-2, and 412G-3 are also collectively referred to as a collimator lens group 412G. The collimator lenses 412B-1 and 412B-2 are also collectively referred to as a collimator lens group 412B.

Each of the collimator lens groups 412 adjusts the laser light emitted from each of the laser light source groups 411. Each of the collimator lens groups 412 may be arranged immediately before each of the laser light source groups 411. Each of the collimator lens groups 412 is an aspherical lens having a flat surface and a convex surface. It is arranged immediately before each of the collimator lens groups 412 so that the flat surface is arranged on each laser light source side and the convex surface is arranged on an opposite side of each laser light source side.

The laser light source unit 410 includes dichroic mirrors 413-1, 413-2, and 413-3. Hereinafter, these three dichroic mirrors are also collectively referred to as a dichroic mirror group 413.

The dichroic mirror 413-1 has optical characteristics to transmit a blue laser light and reflect a green laser light. Due to the optical characteristics, the dichroic mirror 413-1 transmits a blue laser light emitted from the laser light source 411B-1 and reflects a green laser light emitted from the laser light source 411G-2. Thus, the blue laser light emitted from the laser light source 411B-1 and the green laser light emitted from the laser light source 411G-2 are color-synthesized.

Figure 4B:
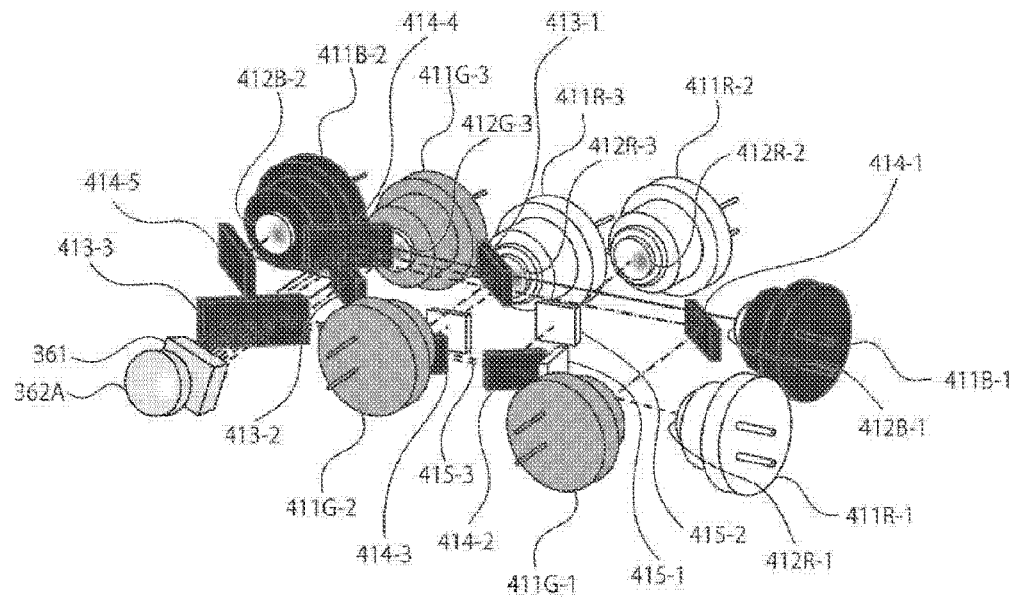
FIG. 4B is a perspective view illustrating another example of the laser light source unit.

Note that as illustrated in FIG. 4B, a reflection mirror 414-1 is arranged on a back side of the paper surface of FIG. 4A with respect to the dichroic mirror 413-1. Thus, the blue laser light emitted from the laser light source 411B-1 does not pass through the reflection mirror 414-1.

The dichroic mirror 413-2 has optical characteristics to reflect a blue laser light and transmit a green laser light. Due to the optical characteristics, the dichroic mirror 413-2 reflects a blue laser light emitted from the laser light source 411B-2 and transmits a green laser light emitted from the laser light source 411G-3. Thus, the blue laser light emitted from the laser light source 411B-2 and the green laser light emitted from the laser light source 411G-3 are color-synthesized.

The dichroic mirror 413-3 has optical characteristics to reflect a red laser light and transmit a green laser light and a blue laser light. Due to the optical characteristics, the dichroic mirror 413-3 reflects a red laser lights emitted from the laser light source group 111R, and transmits laser lights emitted from the laser light source groups 111G and 111B and color-synthesized. Thus, the laser lights emitted from the laser light source groups 411R, 411G, and 411B are aggregated by color synthesis.

One or more of the dichroic mirror group 413 preferably has polarization characteristics. The polarization characteristic may be, for example, a characteristic for improving the polarization ratio. Thus, the polarization ratio of light reflected by the dichroic mirror group 413 can be improved, and for example, a luminous flux more suitable for image projection can be formed.

The laser light source unit 410 includes reflection mirrors 414-1, 414-2, 414-3, 414-4, and 414-5. Hereinafter, these five dichroic mirrors are also collectively referred to as a reflection mirror group 414.

The laser light emitted from the laser light source 414G-1 is reflected by the reflection mirror 414-1 and travels to the reflection mirror 414-4.

As illustrated in FIG. 4B, the reflection mirror 414-1 is arranged on the back side of the paper surface of FIG. 4A with respect to a passing position of the laser light emitted by the laser light source 411B-1. Therefore, the reflection mirror 414-1 does not affect this laser light.

The reflection mirror 414-2 reflects a laser light emitted from the laser light source 411R-2 so that the laser light travels to the dichroic mirror 413-3.

As illustrated in FIG. 4B, the reflection mirror 414-2 is arranged on a front side of the paper surface of FIG. 4A with respect to a passing position of a laser light emitted by the laser light source 411R-1. Therefore, the reflection mirror 414-2 does not affect this laser light.

The reflection mirror 414-3 reflects a laser light emitted from the 411R-3 so that the laser light travels to the dichroic mirror 413-3.

As illustrated in FIG. 4B, the reflection mirror 414-3 is arranged on the back side of the paper surface of FIG. 4A with respect to passing positions of the two laser lights emitted by the laser light sources 411R-1 and 411R-2. Therefore, the reflection mirror 414-3 does not affect these two laser lights.

The reflection mirror 414-4 reflects laser lights emitted from the 411B-1, 411G-1, and 411G-2 so that the laser lights travel to the dichroic mirror 413-3.

The reflection mirror 414-5 reflects a laser light emitted from the laser light source 411B-2 so that the laser light travels to the dichroic mirror 413-2.

Note that the reflection mirrors 414-2 and/or 414-3 may be dichroic mirrors having the concave cylindrical surface as described in (2) above. With the dichroic mirror, the far field pattern can be adjusted as described in (2) above.

The laser light source unit 410 further includes collimator lenses 415-1, 415-2, and 415-3. The collimator lenses 415-1, 415-2, and 415-3 adjust laser lights emitted from the multi-emitter laser light sources 411R-1, 411R-2, and 411R-3, respectively. By this adjustment, it is possible to prevent luminous fluxes of the laser lights emitted from these multi-emitter laser light sources from being split.

Hereinafter, the collimator lenses 415-1, 415-2, and 415-3 are also collectively referred to as a collimator lens group 415.

The collimator lens 415-1 is an aspherical lens having a flat surface and a convex cylindrical surface. The collimator lens 415-1 is arranged so that the flat surface is arranged on the laser light source 411R-1 side and the convex cylindrical surface is arranged on an opposite side of the laser light source 411R-1 side. That is, the laser light emitted from the laser light source 411R-1 enters the collimator lens 415-1 from the flat surface of the collimator lens 415-1, travels in the collimator lens 415-1, and then goes out of the collimator lens 415-1 from the convex cylindrical surface.

Similarly, the collimator lenses 415-2 and 415-3 are also aspherical lenses each having a flat surface and a convex cylindrical surface. The collimator lenses 415-2 and 415-3 are arranged so that the flat surfaces are arranged on the laser light source side and the convex cylindrical surfaces are arranged on an opposite side of the laser light source side.

As described above, the laser lights emitted from the laser light source groups 411R, 411G, and 411B are aggregated by the color synthesis by the light guide unit 115. The luminous flux aggregated by the color synthesis by the light guide unit 115 can travel to the integrator optical system (not illustrated) via, for example, the fly-eye lens 361 and the relay lens 362A described in (2) above.

The light source device of the present technology may include the laser light source unit as described above.

2. Second Embodiment (Projection Type Display Device)

The present technology also provides a projection type display device including a light source device according to the present technology. The projection type display device is, for example, as described in the above "1. First embodiment (light source device)", and the description also applies to the projection type display device according to the present technology. For example, the projection type display device according to the present technology may further include a polarizing beam splitter, a two-dimensional spatial modulation element, and a projection lens in addition to the light source device according to the present technology. The polarizing beam splitter, the two-dimensional spatial modulation element, and the projection lens are also as described in "1. First embodiment (light source device)" above.

Figure 5A:
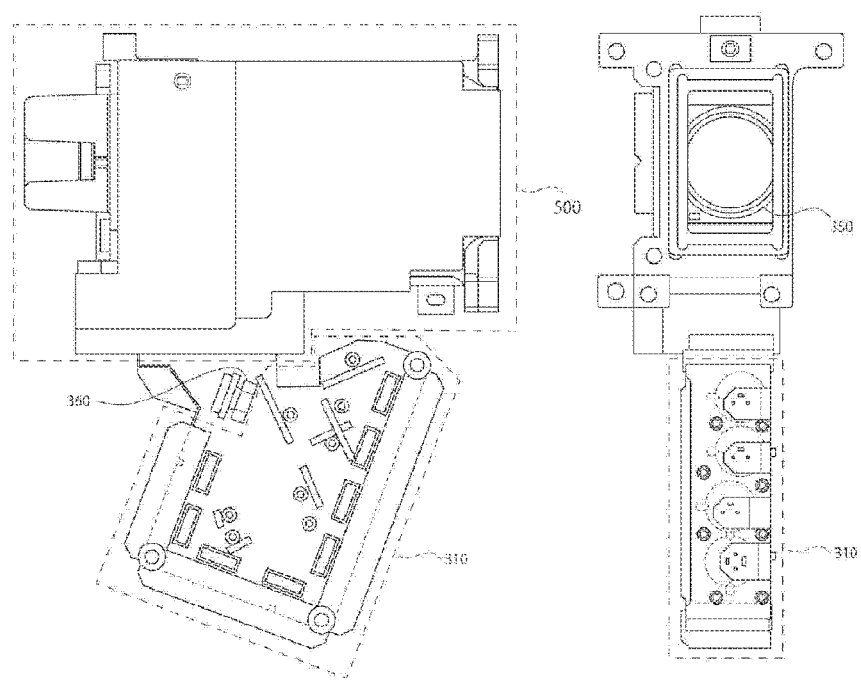
FIG. 5A is a view illustrating a configuration example of the projection type display device according to the present technology.

A projection type display device according to the present technology may be configured, for example, as illustrated in FIG. 5A. FIG. 5A is an example of the configuration of the projection type display device 300 described in the above "(3) Second example of first embodiment (projection type display device including light source device according to present technology)". Among the configurations, an internal structure of the laser light source unit is illustrated. Furthermore, the projection type display device 300 illustrated in FIG. 5A may be appropriately covered with a housing including a heat sink. A left side of FIG. 5A corresponds to the projection type display device 300 illustrated in FIG. 3 rotated 90 degrees to the right. A right side of FIG. 5A illustrates a state in which the projection lens of the projection type display device is directed toward a front side of the paper surface of FIG. 5A. A region 310 in FIG. 5A corresponds to the laser light source unit 310 in FIG. 3. Furthermore, reference numeral 360 in FIG. 5A corresponds to the second integrator optical system 360 in FIG. 3. The polarizing beam splitter prism 330, the two-dimensional spatial modulation element 340, and the projection lens 350 are housed in a region indicated by reference numeral 500.

Figure 5B:
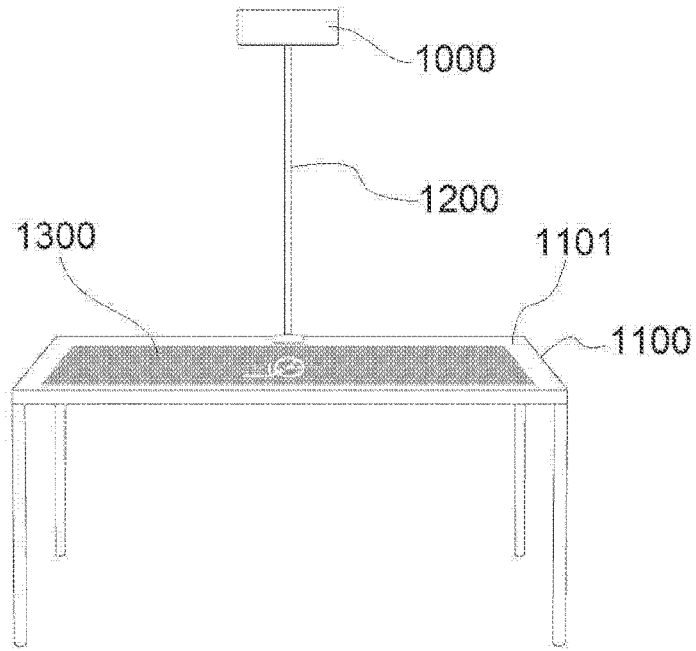
FIG. 5B is a view illustrating an example of how to use the projection type display device according to the present technology.
Figure 5C:
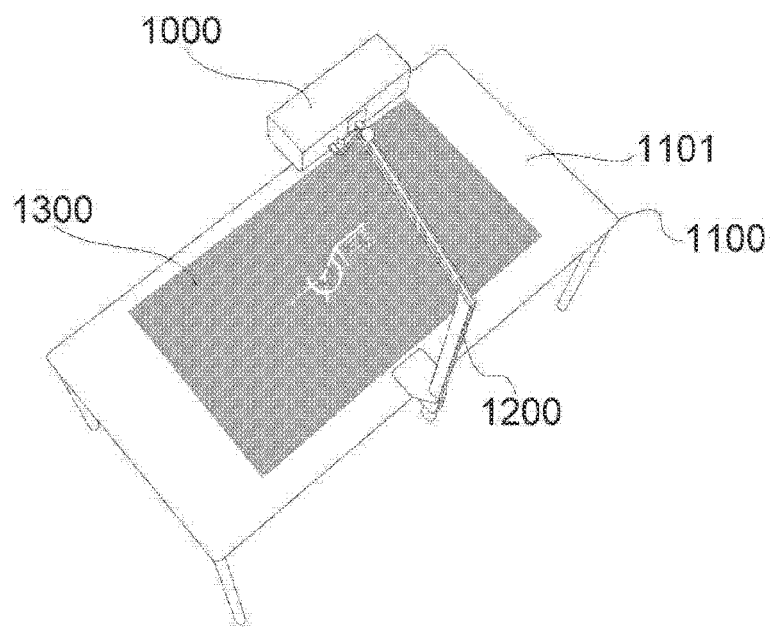
FIG. 5C is a view illustrating an example of how to use the projection type display device according to the present technology.
Figure 5D:
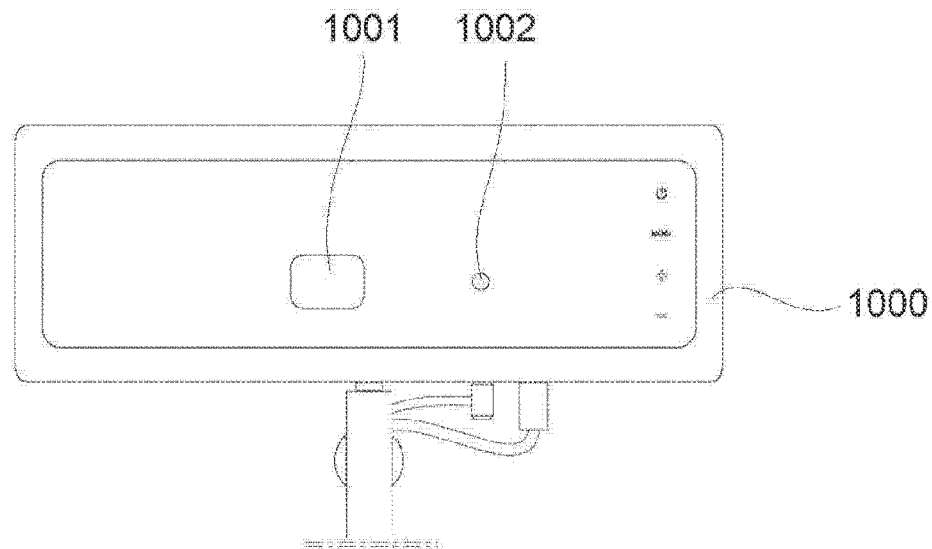
FIG. 5D is a view illustrating a surface on which a projection port for image display light is arranged in the projection type display device according to the present technology.

A method of using the projection type display device according to the present technology will be described below with reference to FIGS. 5B, 5C, and 5D. FIGS. 5B and 5C are views illustrating an example of a use state of the projection type display device according to the present technology. FIG. 5D is a view illustrating a surface on which a projection port for image display light is arranged in the projection type display device according to the present technology.

As illustrated in FIGS. 5B and 5C, a projection type display device 1000 according to the present technology is connected to a boom 1200, and the boom 1200 is fixed to a table 1100. The projection type display device 1000 is arranged so as to project the image display light toward, for example, a top plate surface 1101 of the table 1100. By projection of the image display light, an image 1300 is projected on the top plate surface 1101. By projecting the image 1300 onto the top plate surface 1101 in this manner, a plurality of persons surrounding the table 1100 can see the image.

The image display light projected from the projection type display device 1000 is projected from a projection port 1001 toward the top plate surface 1101 as illustrated in FIG. 5D. As illustrated in FIG. 5D, a camera 1002 may be provided on a surface on which the projection port 1001 is provided. The camera 1002 may be capable of imaging a surface on which the image display light is projected. For example, the projection type display device 1000 projects the image display light on the top plate surface 1101 or on a sheet of paper arranged on the top plate surface 1101, and a person writes letters or draws figures on the top plate surface 1101 or the sheet of paper on which the image by the image display light is projected. After the letters or figures are written or drawn, the image is taken by the camera 1002. Thus, a still image on which the letters or figures are written or drawn can be recorded, or the process in which the letters or figures are written or drawn can be recorded as a moving image.

Figure 6A:
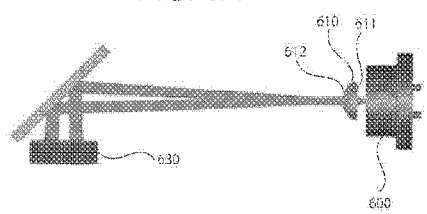
FIGS. 6A and 6B are schematic views illustrating simulation contents of a beam profile and a diagram illustrating a simulation result.
Figure 6B:
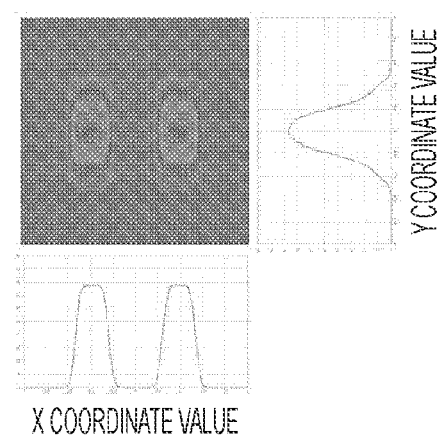
Figure 7A:
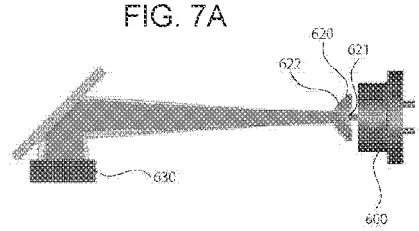
FIGS. 7A and 7B are schematic views illustrating simulation contents of a beam profile and a diagram illustrating a simulation result.
Figure 7B:
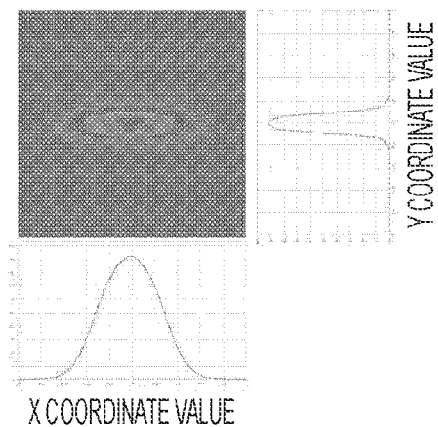

3. EXAMPLE (1) Luminous Flux Split Suppression of Laser Light by Collimator Lens With Cylindrical Surface The FFP of laser light obtained in a case where a laser light emitted from the multi-emitter laser light source is adjusted by the collimator lens without a cylindrical surface and the FFP of laser light obtained in a case where a laser light emitted from the multi-emitter laser light source is adjusted by the collimator lens with a cylindrical surface were simulated by optical software. FIGS. 6A and 6B illustrate schematic view for explaining contents of the simulation in the former case and an image obtained by the simulation. FIGS. 7A and 7B illustrate schematic views for explaining contents of the simulation in the latter case and an image obtained by the simulation.

As illustrated in FIG. 6A, a beam profile of a laser light on an incident surface of an integrator optical system (fly-eye lens) 630 was simulated by optical software, a laser light being obtained by adjusting a laser light emitted from a multi-emitter laser light source 600 that emits a red laser light by a collimator lens 610 having a flat surface 611 and a convex aspherical surface 612. Simulation results are illustrated in FIG. 6B. As illustrated in FIG. 6B, the laser light emitted from the multi-emitter laser light source split into two luminous fluxes.

As illustrated in FIG. 7A, a beam profile of a laser light on an incident surface of an integrator optical system (fly-eye lens) 630 was simulated by optical software, the laser light being obtained by adjusting the laser light emitted from the multi-emitter laser light source 600 that emits a red laser light by a collimator lens 620 having a cylindrical surface 621 and a convex aspherical surface 622. Simulation results are illustrated in FIG. 7B. As illustrated in FIG. 7B, the laser light emitted from the multi-emitter laser light source did not split into two luminous fluxes and formed an elliptical FFP.

As illustrated by FIGS. 6A, 6B, 7A, and 7B, the collimator lens having the cylindrical surface can prevent the luminous flux of a laser light emitted from the multi-emitter laser light source from splitting.

(2) Adjustment of FFP by Moving Collimator Lens in Optical Axis Direction

Change in FFP due to adjustment of the distance between the multi-emitter laser light source and the collimator lens was simulated. In the simulation, change in FFP in a case of using a collimator lens without a cylindrical surface and change in FFP in a case of using a collimator lens with a cylindrical surface were confirmed.

Figure 8A:
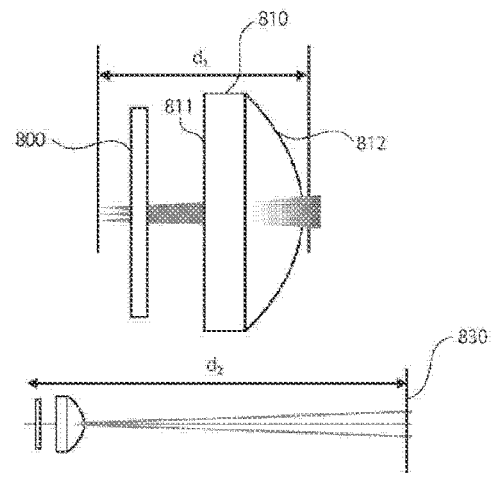
FIG. 8A is a schematic diagram illustrating simulation contents of a beam profile.

As illustrated on an upper side in FIG. 8A, a beam profile of a laser light on an incident surface 830 of an integrator optical system (fly-eye lens) was simulated by optical software, the laser light being obtained by adjusting a laser light emitted from a multi-emitter laser light source 800 that emits a red laser light by a collimator lens 810 having a flat surface 811 and a convex aspherical surface 812. The simulation was performed in each of a case where the distance $d_1$ between the multi-emitter laser light source 800 and the aspherical collimator lens 810 is 3.0 mm, a case where it is 3.1 mm, and a case where it is 3.2 mm. In all of the three simulations, the distance $d_2$ (illustrated on a lower side of FIG. 8A) from the multi-emitter laser light source 800 to the incident surface 830 was 20 mm.

Figure 8B:
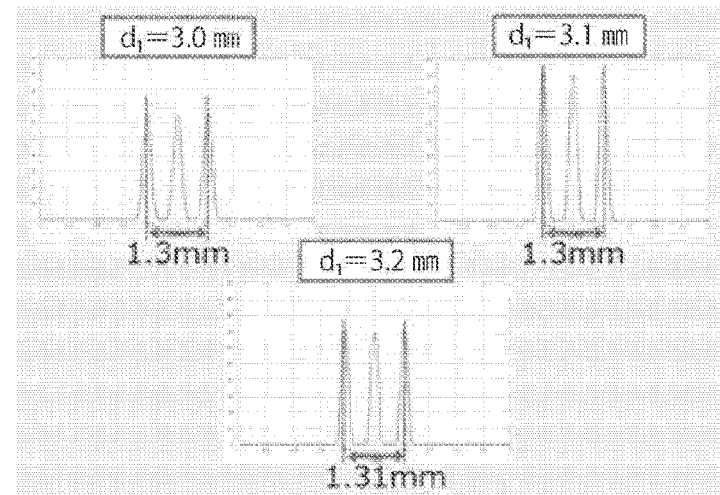
FIG. 8B is a diagram illustrating a simulation result of a beam profile.

Results of the above three simulations are illustrated in FIG. 8B. As illustrated in FIG. 8B, the laser light emitted from the multi-emitter laser light source 800 split into three luminous fluxes in all of the above three simulations. Furthermore, in all of the above three simulations, the distance between peaks at both ends was 1.3 mm or 1.31 mm, and the FFP in the vertical direction hardly changed. Therefore, it is difficult to adjust the FFP by changing the distance between the multi-emitter laser light source and the collimator lens.

Next, as illustrated above in FIG. 9A, a beam profile of a laser light on an incident surface 830 of an integrator optical system (fly-eye lens) was simulated by optical software, the laser light being obtained by adjusting the laser light emitted from the multi-emitter laser light source 800 that emits a red laser light by a collimator lens 820 having a cylindrical surface 821 and a convex aspherical surface 822. The simulation was performed in each of cases where a distance $d_1$ between the multi-emitter laser light source 800 and the aspherical collimator lens 820 was 0.05 mm close to the laser light source from a reference position (where a distance from the laser light source 800 to the apex of a convex surface of the collimator lens 820 at this reference position: 3.3 mm) (b-1), at the reference position (b-2), 0.05 mm away from the laser light source from the reference position (b-3), 0.1 mm away from the laser light source from the reference position (b-4), 0.15 mm away from the laser light source from the reference position (b-5), 0.2 mm away from the laser light source from the reference position (b-6), and 0.25 mm away from the laser light source from the reference position (b-7). In all of these simulations, the distance $d_2$ from the multi-emitter laser light source 800 to the incident surface 830 of the integrator optical system (fly-eye lens) was 30 mm.

Figure 9A:
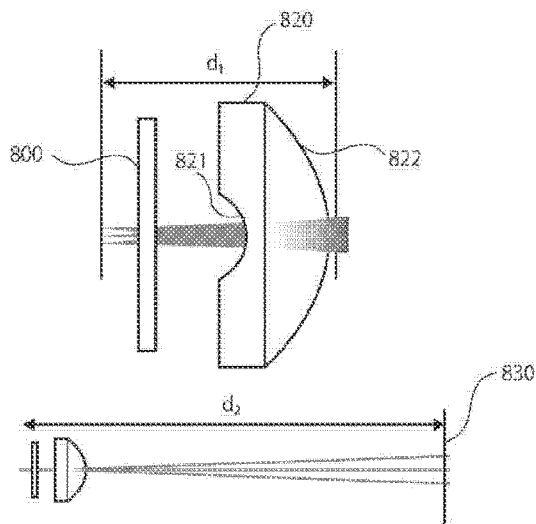
FIG. 9A is a schematic diagram illustrating simulation contents of a beam profile.
Figure 9B:
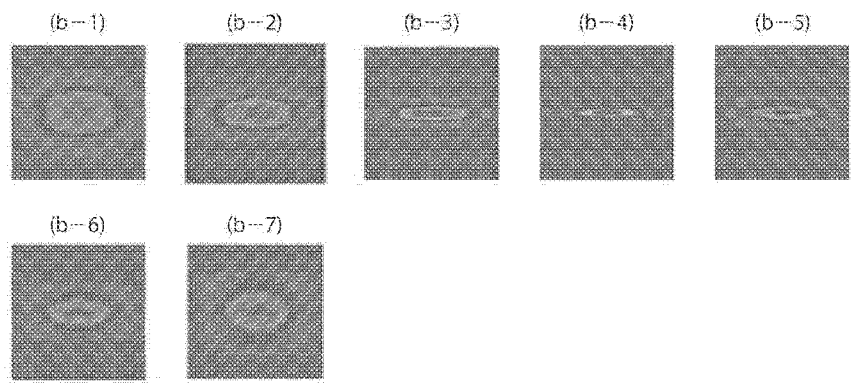
FIG. 9B is a diagram illustrating simulation results of beam profiles.
Figure 9C:
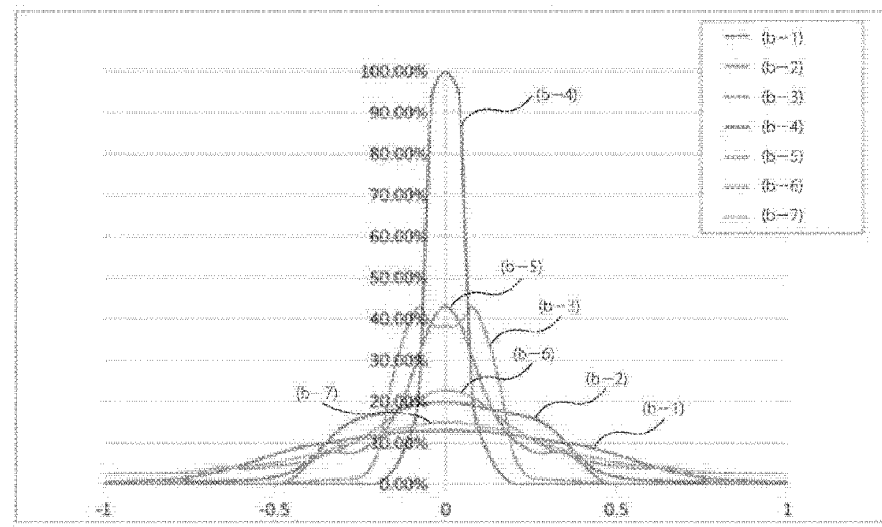
FIG. 9C is a diagram illustrating simulation results of the beam profiles.

Results of these simulations are illustrated in FIGS. 9B and 9C. FIG. 9B illustrates beam profiles. FIG. 9C illustrates a Y-axis intensity distribution. As illustrated in FIGS. 9B and 9C, all of these simulation results indicate that the luminous flux of the laser light emitted from the multi-emitter laser light source 800 did not split.

Furthermore, from these simulation results, it can be seen that the shape of the FFP can be easily adjusted by changing the distance between the multi-emitter laser light source and the aspherical collimator lens.

Next, the beam profile of the laser light was simulated under the circumstances as illustrated in FIG. 9A described above except that the distance $d_2$ from the multi-emitter laser light source 800 to the incident surface 830 of the integrator optical system (fly-eye lens) was changed to 25 mm, 35 mm, or 20 mm.

In the case where the distance $d_2$ is 25 mm, the simulation was performed in a case where the distance $d_1$ between the multi-emitter laser light source 800 and the aspherical collimator lens 820 is a distance at the reference position (where the distance from the laser light source 800 to the apex of the convex surface of the collimator lens 820 at this reference position: 3.3 mm) (c-1), or in a case where the distance $d_1$ is such that the aspherical collimator lens is 0.05 mm (c-2), 0.1 mm (c-3), 0.15 mm (c-4), 0.2 mm (c-5), or 0.25 mm (c-6) away from the laser light source compared to the reference position.

In the case where the distance $d_2$ is 35 mm, the simulation was performed in a case where the distance $d_1$ between the multi-emitter laser light source 800 and the aspherical collimator lens 820 is such that the aspherical collimator lens was 0.1 mm (d-1) or 0.05 mm (d-2) close to the laser light source compared to the reference position (where the distance from the laser light source 800 to the apex of the convex surface of the collimator lens 820 at this reference position: 3.3 mm), or in a case where the distance $d_1$ between the multi-emitter laser light source 800 and the aspherical collimator lens 820 was a distance at the reference position (d-3), or in a case where the distance $d_1$ is such that the aspherical collimator lens was 0.05 mm (d-4), 0.1 mm (d-5), or 0.15 mm (d-6) away from the laser light source compared to the reference position.

In the case where the distance $d_2$ is 20 mm, the simulation was performed in a case where the distance $d_1$ between the multi-emitter laser light source 800 and the aspherical collimator lens 820 is a distance at the reference position (where the distance from the laser light source 800 to the apex of the convex surface of the collimator lens 820 at this reference position: 3.3 mm) (e-1), or in a case where the distance $d_1$ is such that the aspherical collimator lens was 0.05 mm (e-2), 0.1 mm (e-3), 0.15 mm (e-4), 0.2 mm (e-5), 0.25 mm (e-6), 0.3 mm (e-7), 0.35 mm (e-8), or 0.4 mm (e-9) away from the laser light source compared to the reference position.

Figure 10A:
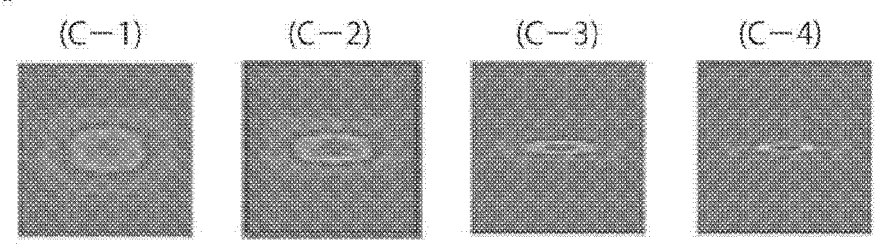
FIG. 10A is a diagram illustrating simulation results of beam profiles.
Figure 10A:
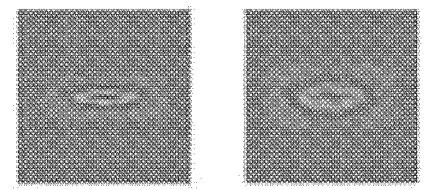
Figure 10A:
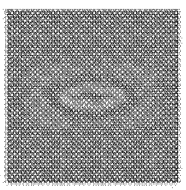
Figure 10A:
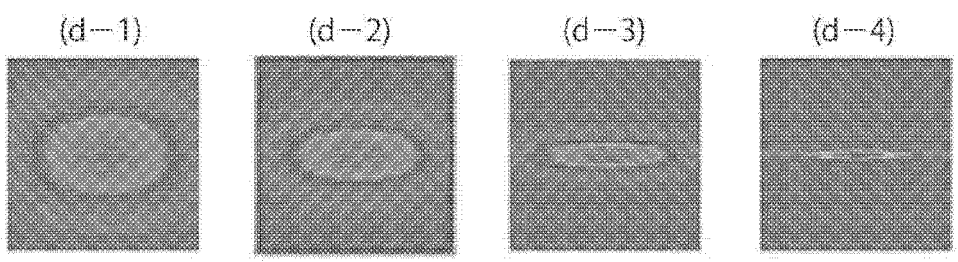
Figure 10A:
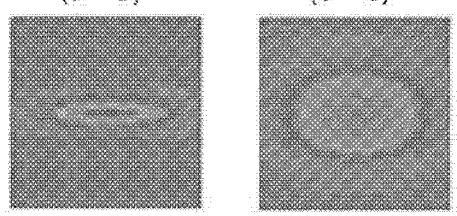
Figure 10A:
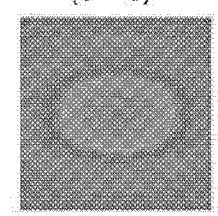
Figure 10B:
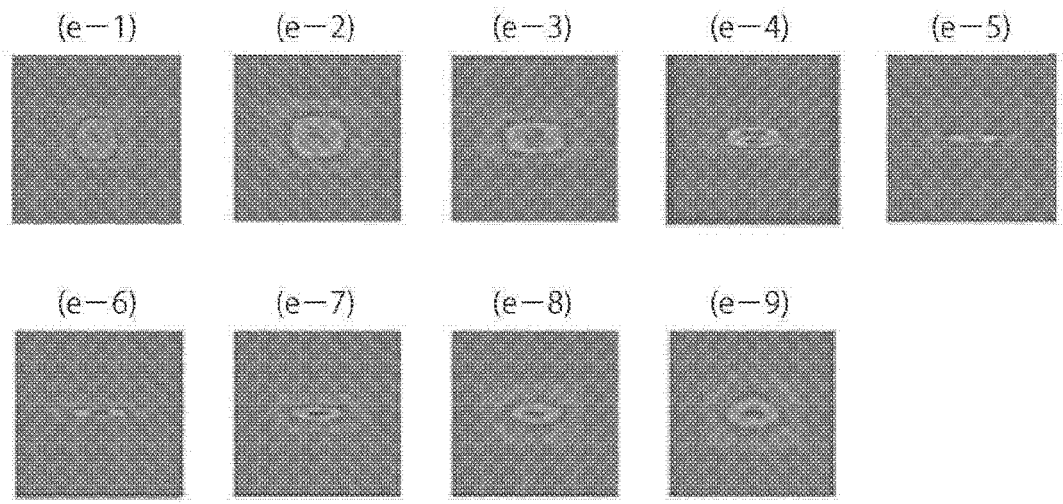
FIG. 10B is a diagram illustrating simulation results of beam profiles.

Simulation results in the cases where the distances $d_2$ are 25 mm and 35 mm are illustrated in FIG. 10A. Simulation results in the case where the distance $d_2$ is 20 mm are illustrated in FIG. 10B. As illustrated in FIGS. 10A and 10B, the laser light did not split at any of the optical path lengths. Furthermore, it can also be seen that the shape of the FFP can be easily adjusted by changing the distance $d_1$.

(3) Illumination Distribution on Panel of Two-Dimensional Spatial Modulation Element An illumination distribution on a liquid crystal panel of the two-dimensional spatial modulation element 340 in the projection type display device 300 having the configuration illustrated in FIG. 3 was simulated by optical software. In the simulation, the LCOS was employed as the two-dimensional spatial modulation element 340.

In the simulation, the FFP of a laser light emitted from the multi-emitter laser light source had an elliptical shape, which was substantially the same shape as the FFP of the laser light emitted from another laser light source.

Figure 11:
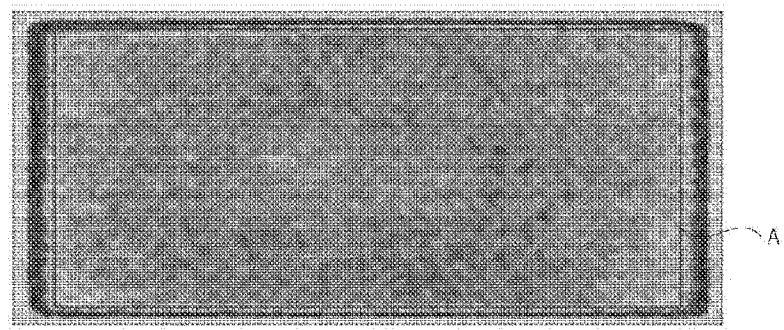
FIG. 11 is a diagram illustrating results of a simulation for confirming an illumination distribution on a liquid crystal panel of a two-dimensional spatial modulation element in the projection type display device.

The illumination distribution was simulated by optical software. FIG. 11 illustrates the illumination distribution obtained by the simulation. In FIG. 11, the effective range of the liquid crystal panel is an area surrounded by a quadrangle A. As illustrated in FIG. 11, the liquid crystal panel was illuminated over the entire effective range.

The illumination distribution on the liquid crystal panel of the two-dimensional spatial modulation element 340 was simulated for a projection type display device that is the same except that a collimator lens having a flat surface and a convex aspherical surface is used instead of the collimator lens having the cylindrical surface and the convex aspherical surface in the projection type display devices 300 having the configuration illustrated in FIG. 3A. In this simulation as well, the LCOS was used as the two-dimensional spatial modulation element 340.

In the simulation, the laser light emitted from the multi-emitter laser light source was adjusted by the collimator lens having the flat surface and the convex aspherical surface. Thus, the FFP of the laser light was not elliptical and did not have substantially the same shape as the FFP of the laser light emitted from another laser light source.

Figure 12:
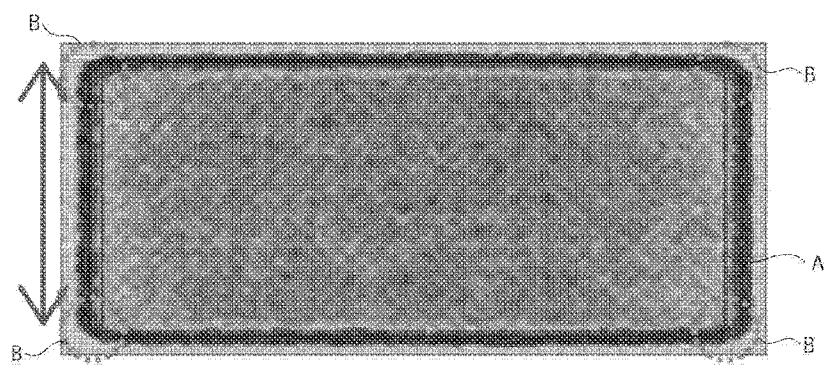
FIG. 12 is a diagram illustrating results of a simulation for confirming an illumination distribution on a liquid crystal panel of a two-dimensional spatial modulation element in the projection type display device.

The illumination distribution was simulated by optical software. FIG. 12 illustrates the illumination distribution obtained by the simulation. In FIG. 12, the effective range of the liquid crystal panel is an area surrounded by a quadrangle A. As illustrated in FIG. 12, upper and lower parts of the effective range of the liquid crystal panel were not sufficiently illuminated. Furthermore, condensation on four corners B of the effective range was insufficient.

From the comparison of results of FIGS. 11 and 12, it can be seen that the illumination distribution on the liquid crystal panel of the two-dimensional spatial modulation element can be made uniform by making the FFP of the laser light emitted from the multi-emitter laser light source have an elliptical shape and have substantially the same shape as the FFP of the laser light emitted from the other laser light source.

Figure 13A:
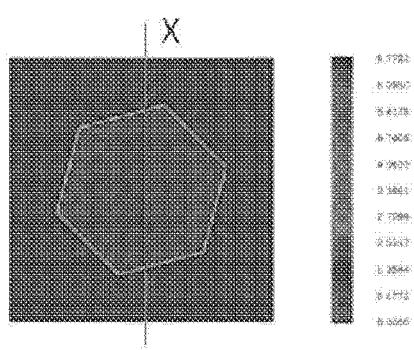
FIGS. 13A and 13B are diagrams illustrating results of a simulation for confirming an illuminance distribution of an image formed by a second integrator optical system in the projection type display device.
Figure 13B:
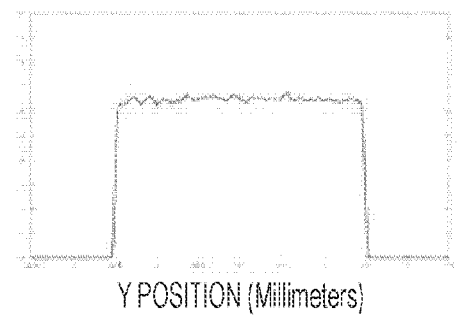

(4) Illuminance Distributions of Image Formed by Second Integrator Optical System Illuminance distributions of an image formed by the second integrator optical system 360 in the projection type display devices 300 having the configuration illustrated in FIG. 3A were simulated by optical software. Simulation results are illustrated in FIGS. 13A and 13B. FIG. 13A illustrates an illuminance distribution of the formed image. FIG. 13B illustrates an illuminance distribution in a vertical cross section X in FIG. 13A. As illustrated in FIGS. 13A and 13B, the illuminance distributions of the image formed by the second integrator optical system were uniform.

Illuminance distributions of an image formed by the second integrator optical system 360 was simulated by optical software with respect to a projection type display device that is the same except that a collimator lens having a flat surface and a convex aspherical surface is used instead of the collimator lens having the cylindrical surface and the convex aspherical surface in the projection type display devices 300 having the configuration illustrated in FIG. 3A. Simulation results are illustrated in FIG. 14. FIG. 14A illustrates an illuminance distribution of the formed image. FIG. 14B illustrates an illuminance distribution in a vertical cross section X in FIG. 14A. As illustrated in FIGS. 14A and 14B, the illuminance distribution of the image formed by the second integrator optical system was not uniform.

From comparison of the results of FIGS. 13A, 13B, 14A, and 14B, it can be seen that the illuminance distribution of the image formed by the second integrator optical system can be made uniform by adjusting with the collimator lens so that the luminous flux of the laser light emitted from the multi-emitter laser light source does not split.

Note that the present technology can also employ the following configurations.

[1] A light source device including:
   a laser light source group including at least one multi-emitter laser light source and at least one non-multi-emitter laser light source that emits a colored light different from that of the multi-emitter laser light source;
   a collimator lens having at least one cylindrical surface that adjusts a laser light emitted from the at least one multi-emitter laser light source; and
   a light guide unit that performs color synthesis of a laser light emitted from the at least one multi-emitter laser light source and having passed through the cylindrical surface and a laser light emitted from the at least one non-multi-emitter laser light source.

[2] The light source device according to [1], further including an integrator optical system that converts a luminous flux aggregated by the color synthesis by the light guide unit into substantially parallel light.

[3] The light source device according to claim 2, in which the integrator optical system is conjugate with a two-dimensional spatial modulation element.

[4] The light source device according to [2], in which
   the light source device is used to form a projection type display device, and
   an angle of incidence θ (°) of the luminous flux on the integrator optical system is within a range represented by a following formula (1), $$\theta < 180/\pi \cdot \sin^{-1}(NA) \tag{1}$$

(where NA=1/(2*F #), F #=EFL/D, F # is a projection lens of the projection type display device, EFL is a focal length of the projection lens of the projection type display device, and D is an aperture diameter of the projection lens).

[5] The light source device according to any one of [1] to [4], in which the light guide unit includes a cylindrical lens having a radius of curvature of 10 mm<R<100 mm or a cylindrical mirror having a radius of curvature of −100 mm<R<−10 mm, and
   the cylindrical lens or the cylindrical mirror is provided on an optical path of a laser light adjusted by the collimator lens.

[6] The light source device according to any one of [1] to [5], in which the light guide unit includes a dichroic mirror having optical characteristics that improve a deflection ratio of the laser light emitted from the multi-emitter laser light source and/or the non-multi-emitter laser light source.

[7] The light source device according to any one of [1] to [6], in which the light source device includes a polarization optical element arranged on an optical path of the luminous flux aggregated by the color synthesis by the light guide unit, and the luminous flux may be incident on the optical element for polarization at substantially Brewster's angle.

[8] The light source device according to any one of [1] to [7], in which a plurality of multi-emitter laser light sources and/or a plurality of non-multi-emitter laser light sources is arranged so that a traveling direction of a substantially central portion of each laser light on an emission surface of each of the light sources does not share one plane.

[9] The light source device according to any one of [2] to [4], further including a second integrator optical system arranged on an optical path between the light guide unit and the integrator optical system.

[10] The light source device according to [9], in which the second integrator optical system includes two fly-eye surfaces, the two fly-eye surfaces have same radius of curvatures R, and an angle of incidence θ (°) of the luminous flux on the fly-eye surface on a side of the light guide unit is within a range represented by a following formula (2), $$\theta < 180/\pi \cdot \tan^{-1}(h/f) \qquad (2)$$

(where f=nR2/((n−1) (2nR−t(n−1))), h is an image height (mm) of a cell of one fly-eye lens, f is a focal length (mm) of the fly-eye lens, n is a refractive index of the fly-eye lens, R is a radius of curvature (mm) of the fly-eye lens, and t is a core thickness (mm) of the fly-eye lens).

[11] The light source device according to any one of [1] to [10], in which the at least one non-multi-emitter laser light source includes a wide-emitter laser light source.

[12] The light source device according to any one of [1] to [11], in which the collimator lens has one concave cylindrical surface, and a radius of curvature of the concave cylindrical surface is −3 mm to −0.5 mm.

[13] A projection type display device including a light source device that includes:
  a laser light source group including at least one multi-emitter laser light source and at least one non-multi-emitter laser light source that emits a colored light different from that of the multi-emitter laser light source;
  a collimator lens having at least one cylindrical surface that adjusts a laser light emitted from the multi-emitter laser light source; and
  a light guide unit that performs color synthesis of a laser light emitted from the at least one multi-emitter laser light source and having passed through the cylindrical surface and a laser light emitted from the at least one laser light source.

REFERENCE SIGNS LIST

100 Projection type display device
110 Laser light source unit
120 Integrator optical system
130 Polarizing beam splitter prism
140 Two-dimensional spatial modulation element
150 Projection lens

The invention claimed is:

1. A light source device, comprising:
  a laser light source group that includes at least one multi-emitter laser light source and at least one non-multi-emitter laser light source, wherein the at least one non-multi-emitter laser light source is configured to emit a colored light different from a colored light of the at least one multi-emitter laser light source;
  a collimator lens having at least one cylindrical surface, wherein the collimator lens is configured to adjust a first laser light emitted from the at least one multi-emitter laser light source; and
  a light guide unit that includes a dichroic mirror, wherein
    the dichroic mirror has optical characteristics that improve a deflection ratio of the first laser light emitted from the at least one multi-emitter laser light source and a second laser light emitted from the at least one non-multi-emitter laser light source, and
    the light guide unit is configured to perform color synthesis of the first laser light emitted from the at least one multi-emitter laser light source and having passed the cylindrical surface and the second laser light emitted from the at least one non-multi-emitter laser light source.

2. The light source device according to claim 1, further comprising an integrator optical system configured to convert a luminous flux aggregated by the color synthesis into substantially parallel light.

3. The light source device according to claim 2, wherein the integrator optical system is conjugate with a two-dimensional spatial modulation element.

4. The light source device according to claim 2, wherein the light source device is in a projection type display device, and
  an angle of incidence θ (°) of the luminous flux on the integrator optical system is within a range represented by a following formula (1), $$\theta < 180/\pi \sin^{-1}(NA) \qquad (1)$$

(where NA=1/(2*F #), F #=EFL/D, F # is a projection lens of the projection type display device, EFL is a focal length of the projection lens of the projection type display device, and D is an aperture diameter of the projection lens).

5. The light source device according to claim 1, wherein the light guide unit includes one of a cylindrical lens having a convex cylindrical surface or a cylindrical mirror having a concave cylindrical surface,
  the convex cylindrical surface has a radius of curvature of 10 mm<R<100 mm and the concave cylindrical surface has a radius of curvature of −100 mm<R<−10 mm, and
  one of the cylindrical lens or the cylindrical mirror is on an optical path of the first laser light adjusted by the collimator lens.

6. The light source device according to claim 1, wherein the light source device includes a polarization optical element on an optical path of a luminous flux aggregated by the color synthesis, and
  the luminous flux is incident on the polarization optical element for polarization at substantially Brewster's angle.

7. The light source device according to claim 1, wherein the at least one multi-emitter laser light source corresponds to a plurality of multi-emitter laser light sources and the at least one non-multi-emitter laser light source corresponds to a plurality of non-multi-emitter laser light sources, and
  the plurality of multi-emitter laser light sources and the plurality of non-multi-emitter laser light sources are arranged so that a traveling direction of a substantially central portion of each laser light on an emission surface of each of the plurality of multi-emitter laser light sources and each of the plurality of non-multi-emitter laser light sources does not share one plane.

8. The light source device according to claim 2, further comprising a second integrator optical system on an optical path between the light guide unit and the integrator optical system.

9. The light source device according to claim 8, wherein the second integrator optical system includes two fly-eye surfaces, the two fly-eye surfaces have same radius of curvatures R, and an angle of incidence θ (°) of the luminous flux on the fly-eye surface on a side of the light guide unit is within a range represented by a following formula (2), $$\theta < 180/\pi \cdot \tan^{-1}(h/f) \qquad (2)$$

(where $f=nR^2/((n-1)(2nR-t(n-1)))$, h is an image height (mm) of a cell of one fly-eye lens, f is a focal length (mm) of the fly-eye lens, n is a refractive index of the fly-eye lens, R is a radius of curvature (mm) of the fly-eye lens, and t is a core thickness (mm) of the fly-eye lens).

10. The light source device according to claim 1, wherein the at least one non-multi-emitter laser light source includes a wide-emitter laser light source.

11. The light source device according to claim 1, wherein the collimator lens has one concave cylindrical surface, and a radius of curvature of the concave cylindrical surface is −3 mm to −0.5 mm.

12. A projection type display device, comprising:
a light source device that includes:
  a laser light source group that includes at least one multi-emitter laser light source and at least one non-multi-emitter laser light source, wherein the at least one non-multi-emitter laser light source is configured to emit a colored light different from a colored light of the at least one multi-emitter laser light source;
  a collimator lens having at least one cylindrical surface, wherein the collimator lens is configured to adjust a laser light emitted from the at least one multi-emitter laser light source; and
  a light guide unit that includes a dichroic mirror, wherein
  the dichroic mirror has optical characteristics that improve a deflection ratio of the laser light emitted from the at least one multi-emitter laser light source and a laser light emitted from the at least one non-multi-emitter laser light source, and
  the light guide unit is configured to perform color synthesis of the laser light emitted from the at least one multi-emitter laser light source and having passed the cylindrical surface and the laser light emitted from the at least one non-multi-emitter laser light source.

13. A light source device, comprising:
a laser light source group that includes at least one multi-emitter laser light source and at least one non-multi-emitter laser light source, wherein the at least one non-multi-emitter laser light source is configured to emit a colored light different from a colored light of the at least one multi-emitter laser light source;

a collimator lens having at least one cylindrical surface, wherein the collimator lens is configured to adjust a laser light emitted from the at least one multi-emitter laser light source;

a light guide unit configured to perform color synthesis of the laser light emitted from the at least one multi-emitter laser light source and having passed the cylindrical surface and a laser light emitted from the at least one non-multi-emitter laser light source; and an integrator optical system configured to convert a luminous flux aggregated by the color synthesis into substantially parallel light, wherein the light source device is in a projection type display device, and an angle of incidence θ (°) of the luminous flux on the integrator optical system is within a range represented by a following formula (1), $$\theta < 180/\pi \cdot \sin^{-1}(NA) \qquad (1)$$

(where $NA=1/(2*F\#)$, $F\#=EFL/D$, F # is a projection lens of the projection type display device, EFL is a focal length of the projection lens of the projection type display device, and D is an aperture diameter of the projection lens).

14. A light source device, comprising:
a laser light source group that includes at least one multi-emitter laser light source and at least one non-multi-emitter laser light source, wherein the at least one non-multi-emitter laser light source is configured to emit a colored light different from a colored light of the at least one multi-emitter laser light source;

a collimator lens having at least one cylindrical surface, wherein the collimator lens is configured to adjust a first laser light emitted from the at least one multi-emitter laser light source; and a light guide unit configured to perform color synthesis of the first laser light emitted from the at least one multi-emitter laser light source and having passed the cylindrical surface and a second laser light emitted from the at least one non-multi-emitter laser light source, wherein the light guide unit includes one of a cylindrical lens having a convex cylindrical surface or a cylindrical mirror having a concave cylindrical surface, the convex cylindrical surface has a radius of curvature of 10 mm<R<100 mm and the concave cylindrical surface has a radius of curvature of −100 mm<R<−10 mm, and one of the cylindrical lens or the cylindrical mirror is on an optical path of the first laser light adjusted by the collimator lens.

* * * * *